(12) United States Patent
Bolt

(10) Patent No.: US 12,001,656 B2
(45) Date of Patent: *Jun. 4, 2024

(54) DIGITAL IMAGING OF GRANULAR MEDIA IN GRAPHICS APPLICATIONS

(71) Applicant: COREL CORPORATION, Ottawa (CA)

(72) Inventor: Stephen Bolt, Stittsville (CA)

(73) Assignee: Corel Corporation, Ottawa (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/058,849

(22) Filed: Nov. 25, 2022

(65) Prior Publication Data
US 2023/0091166 A1    Mar. 23, 2023

Related U.S. Application Data

(63) Continuation of application No. 16/946,409, filed on Jun. 19, 2020, now Pat. No. 11,531,450.

(51) Int. Cl.

| | | |
|---|---|---|
| *G06F 3/0484* | (2022.01) | |
| *G06F 3/0354* | (2013.01) | |
| *G06F 3/0482* | (2013.01) | |
| *G06F 3/04845* | (2022.01) | |
| *G06F 3/0488* | (2022.01) | |
| *G06T 11/00* | (2006.01) | |
| *G06T 11/20* | (2006.01) | |
| *G06T 15/04* | (2011.01) | |
| *G06V 30/32* | (2022.01) | |

(52) U.S. Cl.
CPC .......... *G06F 3/0484* (2013.01); *G06F 3/0482* (2013.01); *G06F 3/04845* (2013.01); *G06F 3/0488* (2013.01); *G06T 11/001* (2013.01); *G06T 11/20* (2013.01); *G06T 15/04* (2013.01); *G06V 30/32* (2022.01); *G06F 3/03545* (2013.01); *G06T 2200/24* (2013.01)

(58) Field of Classification Search
CPC .. G06F 3/0484; G06F 3/0488; G06F 3/03545; G06F 3/0482; G06F 3/04845; G06T 11/001; G06T 11/20; G06T 15/04; G06T 2200/24; G06V 30/32
See application file for complete search history.

(56) References Cited

U.S. PATENT DOCUMENTS

| | | |
|---|---|---|
| 5,060,169 A | 10/1991 | Khosla |
| 6,348,924 B1 | 2/2002 | Brinsmead |
| 8,219,370 B1 | 7/2012 | Diverdi et al. |

(Continued)

*Primary Examiner* — Andrew L Tank
(74) *Attorney, Agent, or Firm* — Rosenberg, Klein & Lee

(57) ABSTRACT

The subject matter of this specification can be implemented in, among other things, a method to display a graphical user interface (GUI) of a graphics application, receive a selection of a first granular medium tool (GMT), receive a first input associated with the first GMT, the first input comprising one or more first input values characterizing placement of a first amount of a granular medium (GM) on a virtual drawing canvas, access one or more settings of the first GMT, determine, using the one or more first input values and the one or more settings, a first spatial distribution of the first amount of the GM on the virtual drawing canvas, and display, on the GUI, a first image corresponding to the first spatial distribution of the first amount of the GM.

20 Claims, 9 Drawing Sheets

(56) References Cited

U.S. PATENT DOCUMENTS

| | | | |
|---|---|---|---|
| 8,335,675 | B1 | 12/2012 | Diverdi et al. |
| 8,854,342 | B2 | 10/2014 | Diverdi |
| 10,521,937 | B2 | 12/2019 | Severenuk et al. |
| 10,559,096 | B2 | 2/2020 | Randall et al. |
| 2003/0161014 | A1 | 8/2003 | Tobita et al. |
| 2011/0181618 | A1 | 7/2011 | Diverdi et al. |
| 2011/0249007 | A1 | 10/2011 | Kuster et al. |
| 2011/0251829 | A1 | 10/2011 | Baxter et al. |
| 2014/0132617 | A1 | 5/2014 | Bhattacharyay et al. |
| 2014/0132619 | A1 | 5/2014 | Landsberger et al. |
| 2015/0153852 | A1 | 6/2015 | Diverdi et al. |
| 2017/0278283 | A1 | 9/2017 | Bloomfield et al. |
| 2018/0336707 | A1 | 11/2018 | Tremblay et al. |
| 2019/0079661 | A1* | 3/2019 | Randall ............... G06F 3/04845 |

* cited by examiner

DIGITAL IMAGING OF GRANULAR MEDIA IN GRAPHICS APPLICATIONS

CROSS-REFERENCE TO RELATED APPLICATIONS

This application claims the benefit of priority as a continuation of U.S. patent application Ser. No. 16/946,409 filed Jun. 19, 2020; the entire contents of which are incorporated herein by reference.

TECHNICAL FIELD

The instant specification generally relates to digital imaging of granular media in graphics application. More specifically, the instant specification relates to creation and manipulation of digital depictions of granular media in graphics applications based on realistic simulations of particles of the granular media.

BACKGROUND

Digital graphics tools and applications are used for creating and manipulating images accessible via a computer. Digital graphics tools are used to develop technical drawings, artistic images, audiovisual, sculptural, and other works. In digital graphics tools, images can be represented using raster or vector graphics and manipulated using a variety of tools and techniques. Digital images can provide illustrations of purely abstract geometric constructs as well as depictions of actual analog objects. Unlike analog paintings and photographs, digital images may have advantages of allowing a greater range of manipulations and flexibility in storing, transmitting, and retrieving images. Digital images can be edited in a variety of ways, for example using amplification, enhancement, artifact removal, motion blur removal, color changes, point of view change, background replacement, and so on. Digital images can be end products or intermediate steps in the creation of analog devices (e.g., actual physical products) or analog art. For example, a building or a sculpture may be first represented as a series of digital images, edited, manipulated, and otherwise used to visualize the end product before the actual building or the sculpture is implemented in physical materials.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3A shows one non-limiting exemplary application of an "Add GM" tool. FIG. 3B shows one non-limiting exemplary application of a "Brush" tool. FIG. 3C shows one non-limiting exemplary application of an "Air Flow" ("Wind") tool. FIG. 3D shows one non-limiting exemplary application of a "Spread" ("Hose") tool. FIG. 3E shows one non-limiting exemplary application of a "Pencil" tool. FIG. 3F shows one non-limiting exemplary application of the "Brush" tool following the application of the "Pencil" tool.

DETAILED DESCRIPTION

Figure 1:
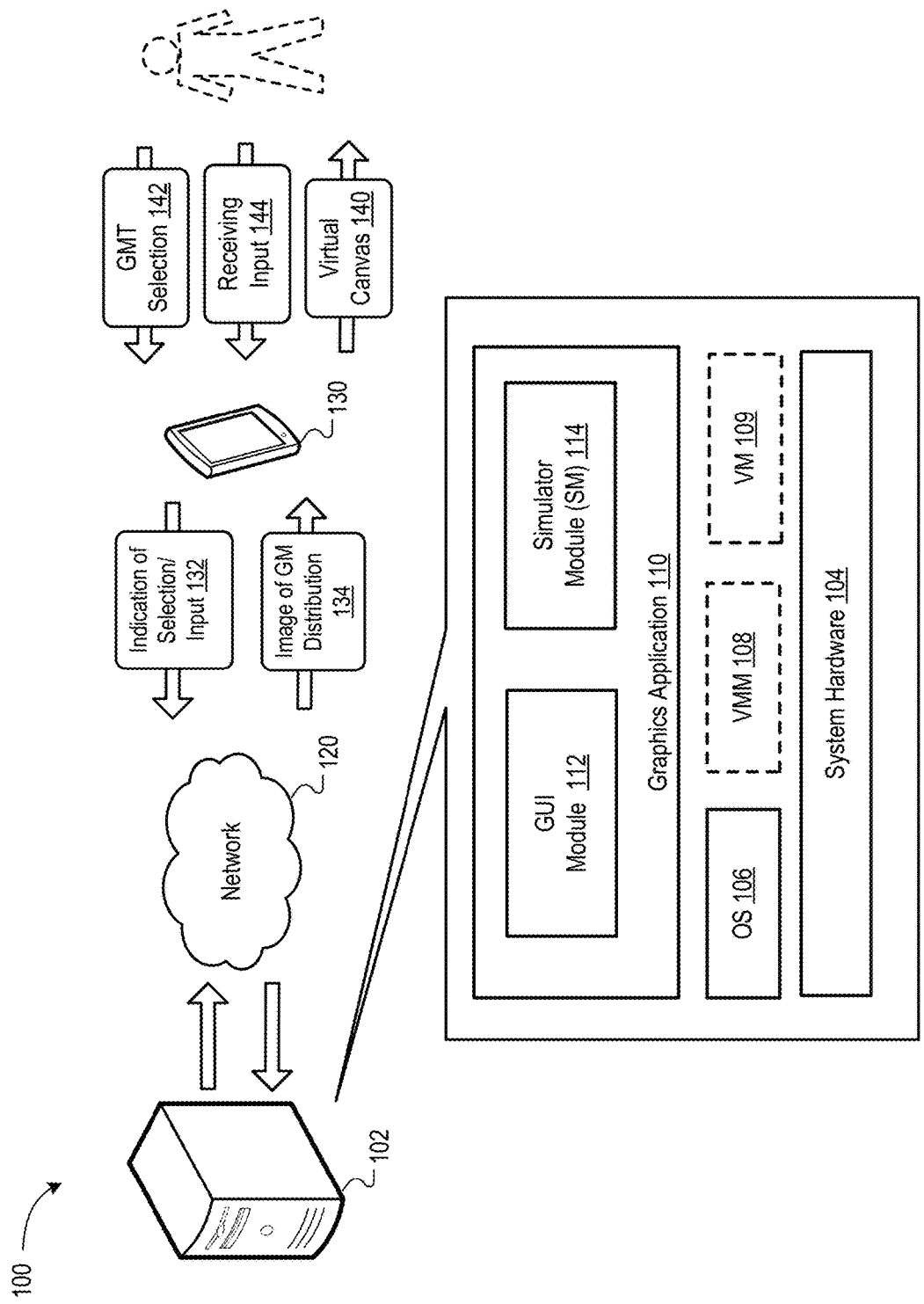
FIG. 1 is a schematic diagram that shows an example computing environment supporting graphics applications capable of enabling digital images of granular media, in accordance with some implementations of the present disclosure.

Traditional art media (such as paint, canvas, gypsum, metal, building structures and parts of buildings, etc.) are often expensive to procure and use and normally require special settings (studios, construction environments, and so on) for their creation. The work area may require complicated clean-up procedures, implementation of safety provisions, controlling access, and the like. The speed of creation is often limited by how fast the actual physical materials can be prepared, formed, and fixed into the art form. Some of the analog art (architectural works, sculptures, museum paintings) is often not replaceable by purely digital images, but other art forms (book and magazine illustrations, motion pictures, computer-accessible imagery, etc.) can frequently be delivered to a viewer in a digital form. Advantages of creation and modification of art in the digital realm includes an ability to undo changes, add or remove layers of work, correct colors, add visual effects, cloning, resizing, and transforming images/shapes, and using many other techniques.

Some art forms include media that are based on particulate, or granular, matter. For example, granular matter (GM) may include charcoal, chalk, pastes, crayons, Conte crayons, graphite, metal shavings, sand grains, and so on, which interact with a painting surface (canvas) by forces of friction or adhesion. Friction against the canvas surface can break off smaller or larger pieces of the material (chalk, crayons), often in a random way. In some instances, the media is not affixed to the canvas, as may be the case in sandpainting and can drift around the surface if subjected to lateral forces (e.g., wind or shaking of the surface). In some instances, some part of the GM may be affixed to the canvas while some part may exist in a free-to-move form. For example, some of the chalk in a chalk painting may adhere to the canvas (e.g., a piece of sidewalk concrete or asphalt) whereas some of the particles of chalk may rest on the canvas without fixation and may move around the canvas if swept with a brush or blown with an air flow. For example, after the chalk has been applied to the canvas by hand, an artist may use a tool (e.g., a brush) to spread the unfixed chalk around the canvas to achieve some additional artistic effects. As unfixed particles of chalk of type and color A are spread to other parts of the painting by the brush, some of the A particles may adhere to other areas of the painting. The presence of other particles (e.g., of chalk particles of a different type and/or color B) on those other areas may affect how the brushed particles A adhere to the canvas. Furthermore, some of the particles added or already present on the canvas may have pigment, e.g., a colored substance that can be transferred from the host particles to the canvas and/or other particles upon contact, dragging, diffusion, and so on. A pigment transferred from the host particles to a receiving medium may affect the color of the receiving medium via color mixing (e.g., a red pigment transferred to a yellow medium may cause the medium to appear orange), and/or the color of the host medium via a loss of some amount of pigment. The final blending result may depend on a variety of physical properties of the materials involved and on the amount of particles of type A and particles of type B on various parts of the canvas. Such physical properties may include: a degree of friction between particles A and the canvas and particles B with the canvas, a degree of friction between particles A and particles B, a degree to which particles A adhere to the canvas, to particles B, or to the brush, on the size and the shape of the brush, a degree to which particles A share pigments with other particles/canvas, color properties of the shared pigments, and so on.

In some instances, the artist can add a fluid (water, oil) to the GM (or, conversely, apply the GM to a wet canvas). In such instances, the interactions among different elements of the painting (canvas, particles) can be modified significantly from their "dry" interactions and may, therefore, result in a rather different outcome. In some instances, the painting can be exposed to natural elements (rain, wind, etc.) which can affect how the GM is distributed within the painting. Creating realistic digital images that depict GM on various canvases may not be possible with the existing graphics applications, since these applications are incapable of realistic characterization of GM based on underlying particle dynamics of the GM. On the other hand, such characterization is important for realistic modeling and authentic visualization of the GM.

Aspects and implementations of the present disclosure address these and other shortcomings of the existing technology by providing for graphical applications that enable realistic digital depictions of granular media on virtual drawing canvases. The graphics applications may use a number of models to account for a variety of physical mechanisms and characterizations responsible for interactions of the granular media with itself, with the canvas, as well as with other objects that may be present in the media-canvas environment. The characterizations may include a size of a particle of the medium (or a range or statistical distribution of particle sizes), a degree of adhesion of the particles of the GM to the virtual drawing canvas, a degree of friction between the particles of the GM and the virtual drawing canvas, an amount of pigment that may be present on the particles of the GM, the affinity of the pigment to the host particles (e.g., the degree to which the pigment is likely to stick to other media and canvas upon contact or diffusion), the ability of the pigment to retain its color when mixed with other pigments or to produce new colors upon mixing with other pigments, and so on. The characterizations may further include a hardness and/or brittleness of the medium (e.g., how likely the particles of the GM are to break off from a solid source of the GM, such as a graphite crystal or a crayon implement). The characterizations may further include a wind speed, a mobility of the particles (i.e., a susceptibility of the particles to the wind), and, in some instances, a marking ability of the particles (i.e., an ability of the particles to leave permanent or temporary markings on the canvas while being moved). The physical mechanisms may include the types and character of motion that the particles of the GM perform under the forces of gravity, forces exerted on the particles by the canvas (forces of friction and adhesion), by other particles, by brushes, and/or by other substances present in the environment. In some implementations, a simulation module of the graphical application may determine dynamics of the particles added to (or already present on) the canvas, e.g., a spatial distribution of the particles of the medium at a series of time instances. Based on the determined spatial distribution(s), the graphical interface module may generate a visual appearance of the distribution(s) for presentation on a graphical user interface (e.g., a computer screen). Granular media imaging applications may be implemented as part of the existing graphics programs, such as Corel DESIGNER®, CorelDRAW®, Corel® Painter™ and/or other existing programs, as well as future graphics programs. Advantages of the disclosed implementations include, but are not limited to, realistic depictions of artistic compositions as well as technical systems involving granular media. Additionally, the functionality provided by the graphics applications having GM imaging tools may reach beyond simulations of realistic systems and extend to effects that cannot be easily realized in actual physical systems, such as simulated effects of explosions, wind storms, anti-gravitation, and the like.

FIG. 1 is a schematic diagram that shows an example computing environment 100 supporting graphics applications capable of enabling digital images of granular media, in accordance with some implementations of the present disclosure. The environment 100 includes a computing system (e.g., a server) 102 in communication (optionally, over a network 120) with a GUI 130. The network 120 may be a local area network (LAN), a wide area network (WAN), and/or one or more of the computing devices that make up the Internet. In some implementations, the GUI 130 may be a part of the computing system 102. For example, the GUI 130 may be provided on a local, to the computing system 102, monitor. In some implementations, the GUI 230 is provided on a screen of a "thin" client having minimal computing capabilities, configured to display the GUI 130 to a user and receive the user's inputs and instructions to be executed on a remote server (e.g., computing system 102).

The GUI 130 may include one or more of input devices for receiving user inputs, for example, a display-pointing device, such as a mouse or a stylus. The GUI 130 may include a touchscreen that uses a capacitive or an inductive sensing array capable of detecting inputs from a bodily touch, e.g., via a finger, thumb, an entire palm, or any part of the palm, or from any intervening mechanical or electrical device (e.g., a stylus or a brush). The GUI 130 may include any text-based input devices (e.g., a keyboard). The GUI 130 may include any additional digital or analog devices, such as a microphone and/or a camera. The GUI 130 may include a speech recognition software for receiving voice inputs or an object recognition software for receiving inputs via the camera (e.g., a video camera). In some implementations, the GUI 130 (or some part of the GUI) may be capable of registering mechanical inputs, e.g., inputs via one or more pressure sensors. In some implementations, the microphone may be configured to detect air being blown into the microphone (e.g., by the user) and determine a speed or pressure of the blown air to serve as an input into the GUI (e.g., an input indicating a speed of the wind directed to the GM).

The computing system 102 may execute a graphics application (e.g., application 110) and provide the application to the user. The graphics application 110 may be a vector-based or a raster-based application. The graphics application may display a virtual drawing canvas to the user, e.g., via a planar projection of the virtual drawing canvas on the GUI screen. In some implementations, the planar projection may be a parallel projection, an isometric projection, a perspective projection, or some other projection on the GUI screen. The user may select (142) a granular medium tool (GMT) to be used in conjunction with depictions and manipulations of the GM on the GUI screen. A selected GMT may be a tool that adds (pours) GM to the virtual canvas at selected locations, spreads or otherwise redistributes the GM previously added to the canvas, simulates motion (e.g., rotation) of the canvas, simulates a wind blowing across the canvas, adds a second (third, etc.) GM of a different type and/or color, adds a fluid substance, and so on. Selection 142 of a GMT may be performed by choosing (e.g., with a mouse click or via any other input method by one of the available input devices) a button, selecting from a menu, responding to a query appearing on the GUI, and the like.

The user may also provide an input associated with the selected GMT. The input may indicate an amount of the GM added, locations on the canvas where the GM is added, a degree of movement of the GM previously added to the canvas, an amount and spread of force applied to the GM added to the canvas, dimensions of a brush used and a path of a sweep made with the brush, a wind speed and direction, an amount and a location of a fluid added, and so on. The provided input may be received (144) by the GUI 130 and provided (132) to the computing system 102. An initial input may be provided (directly, over an internal bus or via the network 120) together with the indication of the GMT selection 142, and subsequent inputs may be separately transmitted to the computing system 102. The computing system 102 may compute what distribution of the GMT the provided input is to generate on the canvas (or how the input may affect the distribution of the GM that has been previously placed on the canvas). The computations may be performed as described in relation to FIG. 2. The computing system 102 may further determine, based on the computed distribution, how the GM on the canvas is to be displayed on the GUI 130. The computing system 102 may generate an image (e.g., a raster image or a vector image) depicting how the GM on the canvas is to appear to a viewer looking at the canvas. The computed image may then be transmitted (134) to the GUI 130 for displaying to the user. In some implementations, only a portion of the image depicting changes caused by the last input is transmitted to the GUI 130. In some implementations, the visualization of the GM may be realistic, to indicate to the user how the GM on the canvas would appear in the real world. In some implementations, the visualization of the GM may be functional, e.g., indicating with a specific color ("color map") the recent changes made to the canvas, with the most recent changes indicated with brighter colors and the earlier changes indicated with darker colors. In some implementations, the color map (or a pattern map, an intensity map, or the like) may indicate various types of GM added to the canvas, wet vs. dry areas, dense vs. loose areas, and the like. In some implementations, various maps may be used to indicate the motion of the GM as a result of the last N user inputs. In some implementations, arrows indicating motion of the GM may be displayed. In some implementations, a topographic map of the GM may be displayed with lines of constant elevation indicating the three-dimensional distribution of the GM. In some implementations, the user may have an ability to switch between different representations (maps), e.g., using a view selector, including an option of removing some or all functional maps and displaying only the realistic view of the canvas.

As depicted in FIG. 1, the computing system 102 may include a system hardware 104 to support execution of the graphics application 110 and operations described in the instant disclosure. The system hardware 104 may include one or more central processing units (CPU), also referred to as "processing devices" in the instant disclosure, communicatively coupled to one or more memory devices and one or more peripheral devices via a system bus. The system hardware 104 may also include output devices, such as speakers, video projectors, video monitors, and the like, and input devices, such as microphones, video cameras, and the like. The system hardware 104 may be operated by an operating system (OS) 106. The graphics application 110 may be instantiated by the OS 106. In some implementations, the graphics application 110 may be implemented as part of a virtual execution environment, as indicated by the (optional) elements of FIG. 1, depicted with dashed rectangles. In certain implementations, the virtual execution environment may be implemented using certain hardware-assisted virtualization features of the computing system 102, which may support executing, a hypervisor/virtual machine monitor (VMM) 108 that manages one or more virtual machines (VM) 109. In various implementations, the VMM 108 may be implemented as a kernel module, a kernel extension, a driver, or a part of the OS 106. In implementations that involve virtualization, the graphics application 110 may be executed as part of the VM 109. In some implementations, the virtual machine environment may use Parallels® Remote Desktop Services (RDS) based on the Remote Desktop Session Host (RDSH) technology, or the Parallels® Virtual Desktop Infrastructure (VDI), or some other similar technology.

"Processing device" herein refers to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor, which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module. A processing device may also be referred to as a CPU. "Memory device" herein refers to a volatile or non-volatile memory, such as random-access memory (RAM), read-only memory (ROM), electrically erasable programmable read-only memory (EEPROM), or any other device capable of storing data. Examples of peripheral devices include storage devices (such as flash memory cards, flash memory sticks, compact disks, hard disk drives (HDDs) or solid state drives (SSDs)), input/output (I/O) devices (such as network interface controllers (NICs)) and various other devices. Certain peripheral devices, such as flash memory cards, compact disks, HDDs, or SSDs, may be hot-pluggable into the computing system 102. Insertion of such a peripheral device into a suitable interface (e.g., a Universal Serial Bus (USB) socket) of the computing system 102 may trigger mounting the peripheral device by the OS 106. Mounting the peripheral device may involve identifying the device type, installing and/or activating an appropriate device driver, and initializing the peripheral device by the OS 106 via the device driver.

The graphics application 110 may include a GUI module 112 configured to generate instructions directing the GUI 130 to display depictions of GM computed by the simulation module (SM) 114. The SM 114 may perform computations (simulations) to determine how GM is distributed across the canvas taking into account various user inputs that cause changes in the GM distribution. The simulations, performed by the SM 114, may be based on a variety of realistic models describing interactions of the GM particles among themselves and with other objects on the canvas.

Figure 2:
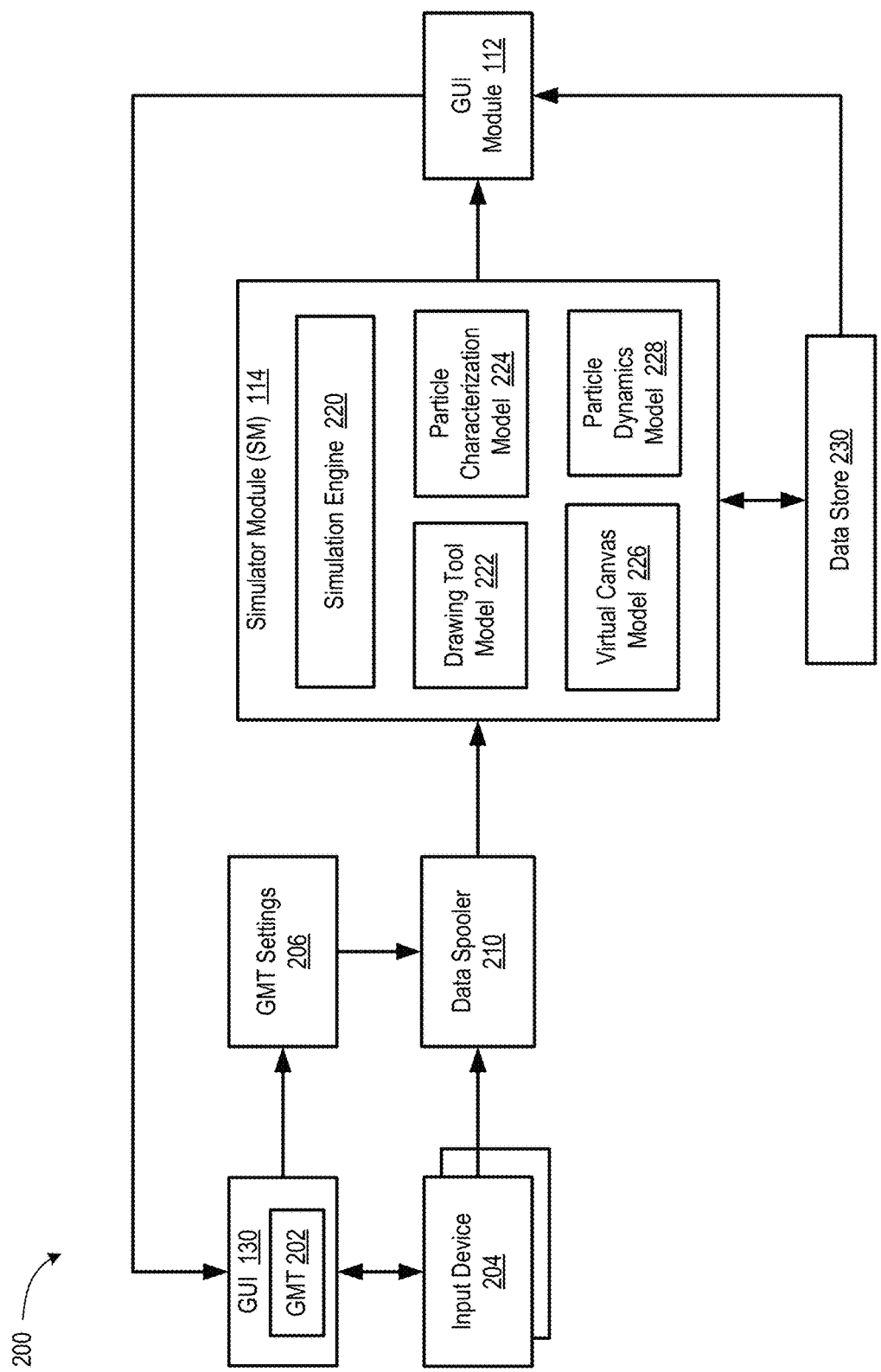
FIG. 2 is a schematic diagram that shows an example system architecture for supporting graphics applications capable of provisioning simulated images of granular matter and enabling manipulations of the simulated images, in accordance with some implementation of the present disclosure.

FIG. 2 is a schematic diagram that shows an example system architecture 200 for supporting graphics applications capable of provisioning simulated images of granular matter and enabling manipulations of the simulated images, in accordance with some implementation of the present disclosure. Depicted in FIG. 2 is the GUI 130, which may be provided by the computing system 102 of FIG. 1. The GUI 130 may be provided via a computer screen, e.g., a screen of a desktop, laptop, tablet, smartphone, or any other screen capable of providing images to a user. For example, the GUI 130 may be an interactive screen with the images optically projected thereon (e.g., by an optical projector). The GUI 130 may include options for selecting one or more granular media tools (GMTs) 202. An array of GMTs may be provided to the user in the form of a set of buttons, pull-down menus, icons, and the like. Examples of provided GMTs may include (but not be limited to) some or all of the following. "Select GM type" may provide selection of the type of the granular material to be added to the canvas, such as charcoal, chalk, pastes, crayon, Conte crayon, graphite, iron shavings, rust, sand, granulated minerals, beans, grains of wheat, rice, or some other plants, and so on. "Select GM color" may provide selection of colors available for the selected type of the GM. "Add GM" may add controlled amounts of the selected GM to chosen (as explained below) locations of the canvas. "Add GM" may have a variety of sub-tools (options) specifying a manner in which the GM is added. For example, one option may be adding a uniform layer of a chosen thickness to a selected area of the canvas. Another option may be pouring a chosen or fixed amount of GM onto a selected location (e.g., point) on the canvas and letting the poured GM spread under the forces of gravity and friction. Another option may be to spray a chosen or a fixed amount of GM radially from a selected location on the canvas within a chosen angle around a specified direction. "Move GM" tool may move all or some portion (percentage) of the GM from a selected first area of the canvas to a selected second area of the canvas. "Vacuum" tool may remove some or all of the GM from a selected area of the canvas. "Air flow" or "Wind" tool may apply a flow of air (of a selected speed) over a selected area of the canvas. "Pencil" tool may apply a solid drawing implement to a selected area of the canvas. The solid drawing implement may have a selectable width and may be a crystal-like structure from which various particles of the medium can break off when the implement is pressed against the canvas. "Add fluid" tool may add water (or other liquid) to a selected region of the canvas. "Brush" tool may apply a brush of selected dimensions to a chosen area of the canvas (e.g., specified by a path connecting a starting location to an ending location). Many other granular media tools 202 can be designed and provided to the user via the GUI 130.

The system architecture 200 may include one or more input devices 204. The input devices 204 may include a mouse, a stylus, a touchscreen, etc., capable of providing inputs from a user's hand, or any other input device capable of providing inputs readable by a computer. The input device(s) 204 can be used to provide both the selection of the GMT and an input made with the help of the selected GMT. For example, once the user clicks (with a mouse or a stylus) on a button "Add GM," a depiction of the tool 202 may appear on the GUI 130. Using the input device 204, e.g., by placing the stylus at a location where the GM is to be added, the user may provide an input to the graphics application 110. The duration of the application of the stylus may indicate an amount of GM to be deposited at the place of the stylus. In some implementations, where the input device 204 is capable of discerning pressure applied by the stylus, the input may indicate the amount of the deposited GM. As another example, once the user clicks on and selects the "Brush" GMT 202, a depiction of a brush may appear on the GUI 130. Using the touchscreen, the user may place a finger (or a palm) at the starting location and draw a path of the brush on the touchscreen to an ending location. In some implementations, the width of the path may be determined by an area of the finger (or the palm) that makes contact with the touchscreen. In some implementations, the speed of the finger's motion may indicate a force applied by the brush. In some implementations, the touchscreen may be capable of determining a degree of pressure exerted by the finger (or any other part of the user's palm) or the stylus, e.g., by detecting a depth of the user's push on the touchscreen, which may be designed with a degree of flexibility for this purpose. For example, the touchscreen may have light detectors measuring a precise amount of light obscured by the user's finger pressed against the touchscreen, or piezoelectric sensors directly sensitive to the pressure applied, or any other types of pressure-sensitive elements. The degree of detected pressure can indicate an amount of force the users intended to apply to the brush or any other GMT 202.

The system architecture 200 may include settings 206 for some or all tools 202 of the graphics application 110. The settings 206 for the "Select GM type" tool may include density, hardness, particle size, etc. for each or some of the selectable types of GM. The settings 206 for the "Select GM color" tool may include a palette of the standard colors or colors previously used by the user. The settings 206 for the "Add GM" may include the amount of matter added per second of application of the tool (or per unit of pressure exerted by the stylus/finger). The settings 206 for the "Move GM" tool may include a percentage of the GM to be moved from the selected area of the canvas. The settings 206 for the "Vacuum" tool may similarly include a percentage (or an amount) of the GM to be removed (e.g., per second of application of the tool) from the selected areas. The settings 206 for the "Air Flow" or "Wind" tool may include a susceptibility of particles of the GM to the wind, and may further include the wind speed (in those implementations where the wind speed is not specified as part of the input). The settings 206 for the "Pencil" tool may include the hardness of the drawing implement, an average size of particles that break off from the implement, a number of particles that break off per unit of time (e.g., second) for various pressures, a standard pressure applied to the implement, and the like. The settings 206 for the "Add fluid" tool may include the type of fluid, the density and surface tension of the fluid (e.g., fluid-canvas surface tension and/or fluid-particles surface tensions), and the amount of fluid to be dispensed per second (if such amount is not specified as part of the user input). The settings 206 for the "Brush" tool may include the geometric dimensions of the brush, such as the width of the brush, the shape of the brush, a stiffness of the brush, a length of bristles of the brush, and the like. The settings 206 may include settings for the canvas, such as a type of canvas, e.g., paper surface, wood surface, metal surface, pavement (asphalt or concrete), brick or glass, and the like. The settings for the canvas may include indications of the geometry of the canvas, such as the profile of the canvas, e.g., a dependence of the height of the surface h(x, y) on the in-plane coordinates x and y. The settings of the canvas may include indications of how smooth or abrasive its surface is.

In this disclosure, "inputs" are referenced to indicate parameters into a user-selected operations that are separately specified for each action, e.g., a location where GM is added or removed or where the brush is applied. In this disclosure, "settings' indicate parameters into the user-selected operations that may remain the same for multiple operations, e.g., the size of the particles, the degree to which particles interact with other particles and with the canvas, the shape and the properties of the canvas. It should be understood, however, that settings may remain fixed for the convenience of the user (so that the user does not have to enter a multitude of parameters for each input), but that the settings may be changed by the user whenever desired and/or convenient. In some implementations, the inputs may include modification of the settings. Likewise, settings 206 may be modified between inputs, e.g., changed by the user by accessing the settings via the GUI 130 and adjusting any of the parameters of the GMT tools or the canvas.

The data associated with the user's input entered via one of the input devices 204 may be sent by the graphics application 110 to a data spooler 210. The settings of the GMT selected by the user may likewise be sent to the data spooler 210. For example, when the user selects "Add GM" tool and indicates a location and an amount of GM to be added to the canvas, the graphics application 110 may send the input data to the data spooler 210. Having detected the selection of the "Add GM" tool, the graphics application 110 may spool, to the data spooler 210, such settings for the "Add GM" tool like the size of the added particles, the type of the particles (e.g., rounded, coarse, rough, etc.), mass density of the particles, coefficients of friction between the particles and the canvas (and/or particles of other GM previously placed on the canvas). The spooled settings may include indications whether the particles of the added GM leave markings on the canvas (e.g., graphite particles on asphalt, paper or wood canvases) or not (graphite particles on glass). The graphics application 110 may also spool, to the data spooler 210, the geometry of the canvas (of the entire canvas or at least of some area around the locations where the particles are added). In some implementations, if the use of the GMT tool is not the first use by the user, the graphics application may not have to spool the settings to the data spooler 210 again, but may check whether the GMT settings 206 have changed since the last spooling and only provide to the data spooler those settings that have been updated in the meantime.

Having collected the data (GMT inputs and GMT settings), the data spooler may send the data (or otherwise make the data available) to the simulation module (SM) 114. The SM 114 may be a software component, or a combination of software components, that may include a simulation engine 220 and a set of models to model various aspects of the granular media, such as motion of the particles of the GM, interaction between particles of the GM, interaction between different types of GM, interaction between various GM and the canvas or the brushes, and so on. For example, the SM 114 may have a drawing tool model 222 to characterize various tools that may be selected by the user. For example, the drawing tool model 222 may simulate the size and the shape of the brush. The drawing tool model 222 may use the identification of the brush selected by the user, access the settings for the brush provided by the data spooler 210 (such as the number and stiffness of the bristles of the brush), evaluate the input by the user (e.g., pressure applied to the brush) and compute the width of the area on the canvas swept by the brush. As another example, when a GMT is a "Finger" tool or a "Smudge" tool, the drawing tool model 222 may access the input data obtained from the input device 204 and determine how many fingers have been deployed by the user in providing the input, at what angles the fingers are held to the touchscreen, what amount of pressure is applied by the user, and the like. In some implementations, the drawing tool model 222 detects an input provided by a fingernail and determines what type of forces the fingernail is to exert on the GM (which may be different from the forces exerted by softer fingertips). In some implementations, the drawing tool model 222 may detect a "Blob" input where the user applies a part of the palm, a back of the hand, a fist, etc., to the input device 204. Accordingly, the drawing tool model 222 may determine forces that the blob contact may exert on the GM depending on the shape and size of the contact area. In the instances of a "Wind" tool, the drawing tool model 222 may determine the direction and the speed of wind as input by the user. For example, if the "Wind" input is provided via a stylus, the direction of the wind may be determined from the azimuthal angle that the stylus makes with some reference direction whereas the wind speed may be determined by a polar angle of the stylus (e.g., the angle that the stylus makes with the direction perpendicular to the touchscreen). The stylus pointed almost perpendicularly to the screen may indicate low wind speeds while the stylus held almost parallel to the screen may indicate wind speeds closer to the maximum wind speed (the maximum being specified in the settings of the "Wind" tool). In some implementations, the wind speed may be indicated by the amount of pressure applied to the stylus (or the finger), whereas the angle at which the stylus is held may indicate the width of the sector where the wind is blowing, with more acute angles indicating a narrower sector (in the direction indicated by the point of the stylus) and angles closer to 90 degrees indicating the wind blowing into wider sectors (with the 90 degree stylus hold indicating that the wind is blowing equally along all in-plane directions from the point the stylus, in one implementation).

The extent to which the wind affects the GM may depend on the characteristics of the canvas, such as a degree of adhesion of the particles of the GM to the canvas. The degree of adhesion may depend on the degree of wetness of the canvas and/or wetness of the GM previously added to the canvas. For example, the drift velocity of the particles of the GM may be proportional to the wind speed and inversely proportionally to the degree of adhesion of the particles to the canvas, in one implementation. In other implementations, different models of drift and adhesion may be used.

The SM 114 may further include a particle characterization model 224. The particle characterization model 224 may determine the size of the particles of the GM, such as the average size, the dispersion, the minimum and the maximum size of the particles, and/or the like. For example, the particle characterization model 224 may evaluate the input by the user to determine the simulated pressure to be applied to the GM. For example, when the user deploys the "Pencil" tool, the user may communicate the amount of pressure by, e.g., actually applying pressure to the pressure-sensitive screen, or indicating pressure in some other way (such as by the angle at which the stylus is held to the screed). The particle characterization model 224 may determine how the applied real-life pressure would affect the drawing implement. For example, this may include evaluating at what rate the GM of the implement would be shaved off due to the implement being pressed against the canvas, what average size the particles breaking off would have, the variation in the size of the particles (e.g., the standard deviation in the size), and the like. The particle characterization model 224 may further determine if the particles of the drawing implement are to retain their color or whether the particles breaking off are to change their color due to mixing with the pigment of the canvas or another matter previously added to the canvas. The particle characterization model 224 may also determine how far the particles that are breaking off from the implement travel, in what direction the particles break off (along the direction of the implement's motion, backwards, sideways, etc.). The particle characterization model 224 may further determine the types of markings the particles that are breaking off are likely to leave on the canvas and/or other matter previously deposited on the canvas. The particle characterization model 224 may also determine whether the particles that are breaking off are likely to undergo further breaking and/or further mark the canvas if a brush, wind, or other tools are subsequently applied to the particles.

The particle characterization model 224 may further describe characterization of one or more pigments that may be present in the particles. A pigment may be characterized with its color, affinity to the host particle (the lower the affinity the greater the amount of the pigment that may be transferred to other material via contact, diffusion, etc.), a degree to which the pigment is to retain its color when mixed with other pigments (e.g., pigments present in other particles) or to blend into a new color combination, and so on.

The SM 114 may further include a virtual canvas model 226. The virtual canvas model 226 may characterize a surface of the virtual canvas. The user may select one of available pre-set virtual canvases simulating various real-life painting surfaces, such as pavement, cloth canvas, wood floor, metal, brick, concrete, paper, as well as other artistic surfaces. In some implementations, each of the pre-set virtual canvases are characterized (by the virtual canvas model 226) via a number of parameters, such as coefficients of friction (for various pre-set granular media), elasticity or rigidity of the canvas (a degree to which the canvas deforms when a force is applied to it), a color of the canvas, a degree to which the pigment of the canvas changes when in contact with various GM, a degree to which the appearance of the canvas changes under environmental conditions (e.g., when sunlight is incident on the canvas), and so on. In some implementations, the virtual canvas model 226 may characterize adhesion between various granular media and the virtual canvas. In some implementations, adhesion may be described with a model where a particle adheres to the virtual canvas until the force acting on the particle exceeds a threshold force. In some implementations, the adhesion model (e.g., the magnitude of the threshold force) may be controlled by a user via settings of the virtual canvas model 226 and/or the graphics application 110.

In some implementations, the virtual canvas can be a custom canvas that may be set up by the user by specifying the above listed (or other) parameters. The parameters may be specified by selecting corresponding numerical values for the parameters or by using visual interfaces (e.g., sliding bars, dials, or any other types of interfaces). In some implementations, the virtual canvas model 226 may define a texture of the virtual canvas. For example, the surface of the canvas may curved and described by a profile h(x, y), defining the height of the canvas h as a function of a location of the canvas within the coordinate plane, x, y. In some implementations, the variations of the profile may be randomly selected by the virtual canvas model 226. In some implementations, the profile may be one of a number of pre-defined shapes, such as a flat canvas, a part of a sphere (e.g., a concave or convex part), a part of a cylinder, ellipsoid, parallelepiped, pyramid, or a surface of any other geometric shape. Each of the predefined shapes can be scaled along one, two, or three directions, e.g., based on the user's input. In some implementations, different pre-defined shapes can be combined to create more complex geometries. For example, some part of the virtual canvas may have a profile of a first predefined shape (e.g., a pyramid) whereas another part of the virtual canvas may have a different profile of a second predefined shape (e.g., a cylinder), In some implementations, the same part of the canvas can have a combined profile of two superimposed shapes, such as an ellipsoid with a pyramid on top of it, in one example. Any number of pre-defined shapes may be combined within the virtual canvas or any area of the virtual canvas, to model real-world as well as abstract structures that the user may use for adding granular media. In some implementations, the user may be offered a special virtual canvas setup interface where selecting, combining, scaling up or down of various predefined shapes can be done using a variety of pointing devices (mouse, stylus) and menus. The virtual canvas model 226 may keep track of the geometry of the virtual canvas as GM is added to the canvas on manipulated. For example, the virtual canvas model 226 may determine a local slope (gradient) and curvature of the virtual canvas surface and ascertain the gravitational and frictional forces acting on GM at various location of the canvass. As a result, the particles of GM may have a tendency of pooling into low regions of the surface and sliding down from high regions of the surface.

The SM 114 may further include a particle dynamics model 228. The particle dynamics model 228 may characterize motion of the particles of various granular media when subject to external forces and influences. The particle dynamics model 228 may include one or more simulation procedures to simulate motion of the particles of GM. Such procedures may be based on equations of motion for individual particles. In some implementations, the simulation procedures may use lattice gas automata methods, such as lattice Boltzmann methods, in which the virtual canvas may be subdivided into lattice cells small enough to approximate that all particles inside the cell have the same velocity (speed and direction of propagation). The lattice Boltzmann model may also track a number of particles contained in each cell. The lattice Boltzmann model may also account for the forces of gravity and friction forces acting between particles of adjacent cells. The simulation procedures may extend over a period of time, e.g., in the form of a time series where dynamics of the particles' motion is tracked at a series of times $t_1, t_2, \ldots t_j, \ldots$ Transfer of particles between cells on a virtual canvas simulates motion of the real-life particles on the real-life drawing canvas.

The transfer of particles, namely, the locations of the particles at a moment of time $t_j$ may be determined by the particles' velocity $\vec{v}(t_{j-1})$ at the preceding moment of time $t_{j-1}$, with the particles drifting to other cells. The velocity of the particles at a later instance of time $t_{j+1}$ may be obtained from particles' accelerations at time $t_j$, which, in turn, are determined by forces $\vec{f}(t_j)$ acting on the particles at time $t_j$. In addition to the drift of the particles between the cells, the simulation procedures may account for collisions of the particles. Specifically, when particles drift into the same cell from different directions, the particles may collide and change their velocities according to various mechanisms, e.g., elastic collisions, inelastic collisions, partially inelastic collisions, and the like. The number of particles within a given cell may evolve based on the drift and collision dynamics of the particles. In some implementations, the particle dynamics module 228 may simulate effects of randomness in the motion of particles. For example, the particle dynamics module 228 may simulate random forces acting on the particles from their environment. Such simulations may be performed using fuzzy logic or random number generators.

The simulation engine 220 may use some or all of the models 222-228 (as well as other models not explicitly shown in FIG. 1) to determine the changes to the distribution of the particles of GM on the virtual canvas. For example, when the "Add GM" tool is selected by the user, and the corresponding input is received by the data spooler 210 at time $t_1$, the simulation engine may begin a time series simulations. Is one exemplary non-limiting implementation, the simulation engine 220 may run the drawing tool model 222, the particle characterization model 224, the virtual canvas model 226, and the particle dynamics model 228 in parallel with the outputs of each one of the models at a specific instance of time $t_j$ serving as inputs (into the same model and other models) at the next instance of time $t_{j+1}$. For example, the output of the drawing tool model 222 for the time $t_j$ may describe how the drawing tool interacts with the particles of the GM at that time. For example, the user's input may be extended in time, with the "Add GM" tool adding the GM at different instances of time along some path. The amount of GM added may depend on time so that various locations of the virtual canvas receive different amounts of GM. Likewise, the "Brush" tool may perform a continuous action sweeping the virtual canvas at different times and locations while applying varying pressure. Accordingly, the particle characterization model 224 may determine how individual particles at the instant location of the brush may respond to the instant pressure from the brush, e.g., the amount of force experienced by the particles that are in contact with the brush, the likelihood that the particles will break into smaller particles and/or leave markings on the canvas or other particles, and so on. The virtual canvas model 226 may determine how the particles, at the instant time $t_j$, may interact with the virtual canvas. Specifically, the virtual canvas model 226 may access the local properties of the virtual canvas (e.g., local curvature, slope, roughness, etc.) and determine the amount of forces (e.g., friction forces) that may be exerted on the particles by the virtual canvas or indirectly caused by the virtual canvas (e.g., determine the amount of tangential gravity forces exerted due to the slope of the canvas). The particle dynamics model 228 may use, as inputs, forces produced by the GMT (model 222) and by the virtual canvas (model 226) as well as local size and properties of the particles (model 224) and evaluate collective dynamics of the GM. At the next instance of time $t_{j+1}$, the information output by the particle dynamics model 228, together with the outputs of the other models, may be input into the models (some or all) for further processing of the GM dynamics. In the described way, the simulation engine 220 may perform a time series processing of the user's input to determine the distribution of the GM that occurs after the input ceases and the GM reaches a state of equilibrium. Processing of each step in the time series may be performed using parallel processing, with various computations (e.g., of different models 222-228) carried out in parallel.

The obtained distribution of the GM may be displayed for at least some of the instances of time $t_k$ of the time series to provide the user with the visual picture of how the user's actions affect and modify the distribution of the GM on the virtual canvas. The SM 114 may provide the distribution(s) at time(s) $t_k$ to the GUI module 112. The distribution may be represented via a spatial map of the density of particles of the GM $n(x, y, t_k)$ at locations (x, y) on the virtual canvas. If more than one type of particles (or more than one color) have been added to the virtual canvas, the SM 114 may provide to the GUI module 112 multiple maps $n_a(x, y, t_k)$ for as many particles (or colors) as have been placed on the virtual canvas, numbered by index a that assumes a different value for each separate particle/color combination. In some implementations, the distribution of the particles may be represented by an elevation map of the GM, $h(x, y, t_k)$.

Having received the distribution(s), the GUI module 112 may determine how the computed distribution is to appear to the user when viewed from a specific vantage point (point of view). The vantage point may be a default vantage point or any vantage point selected by the user. For example, the user may be presented with a vantage point selector to select the point of view, e.g., allowing the 360-degree azimuthal view and the 90-degree polar view from the hemisphere above the canvas. In the instances where the canvas is a surface of a 3D object (e.g., the surface of a sphere or any other figure), the GUI module 112 may allow selecting the vantage point from anywhere on a full sphere (i.e., allowing the 360-degree azimuthal view and the 180-degree polar view). Based on the received distribution of the GM the GUI module 112 may compute, for the selected (or default) vantage point, how the distribution is to appear to the user. For example, the GUI module 112 may extend the lines of sight from the vantage point to various points (e.g., a mesh of rectangles or other figures) on the virtual canvas and determine the density of particles (e.g., per unit solid angle at which the respective rectangle is seen from the vantage point) of various colors located at the respective points and determine the color and intensity of the corresponding pixel on the GUI screen. The pixels may have associated RGB (or CMYK) values ranging between 0-255, of within any other limits. The composed pixel map may then be presented as an image (e.g., a bitmap or other raster image) to the user on the GUI screen. The process may be repeated whenever a new user input is received. In those implementations where the input has an extended duration in time, the GUI module 112 may display multiple images to the user, e.g., corresponding to every time instance $t_k$ in the time series simulations, or every fifth instance, tenth instance, and so on, based on balancing computational overhead against advantages of more frequent visual feedback provided to the user.

The SM 114 may store the results of the simulations in a data store 230. The SM may store, for a time instance $t_k$ in the time series, an information that characterizes the distribution of the GM placed on the virtual canvas. Stored may be distributions corresponding to every time instance $t_k$, or every fifth instance, tenth instance, and so on, based on availability of storage space in the data store 230. The information stored may include a full description of the state of the GM at time instance $t_k$, such as the density and velocity distributions for various particle types and colors that have been placed on the canvas. The information stored may also include parameters characterizing the GM, the canvas, the wind, and so on (provided that the parameters have been modified by the user from their respective default parameters). Using the stored descriptions, the SM 114 may be capable of undoing the recent changes by selecting one of the past distributions stored for one of the time instances $t_k$. When the user closes the image, stores the image, and reopens it later, some of the stored distributions may still be available, to reverse some of the changes made prior to closing the image, if needed.

Figure 3A:
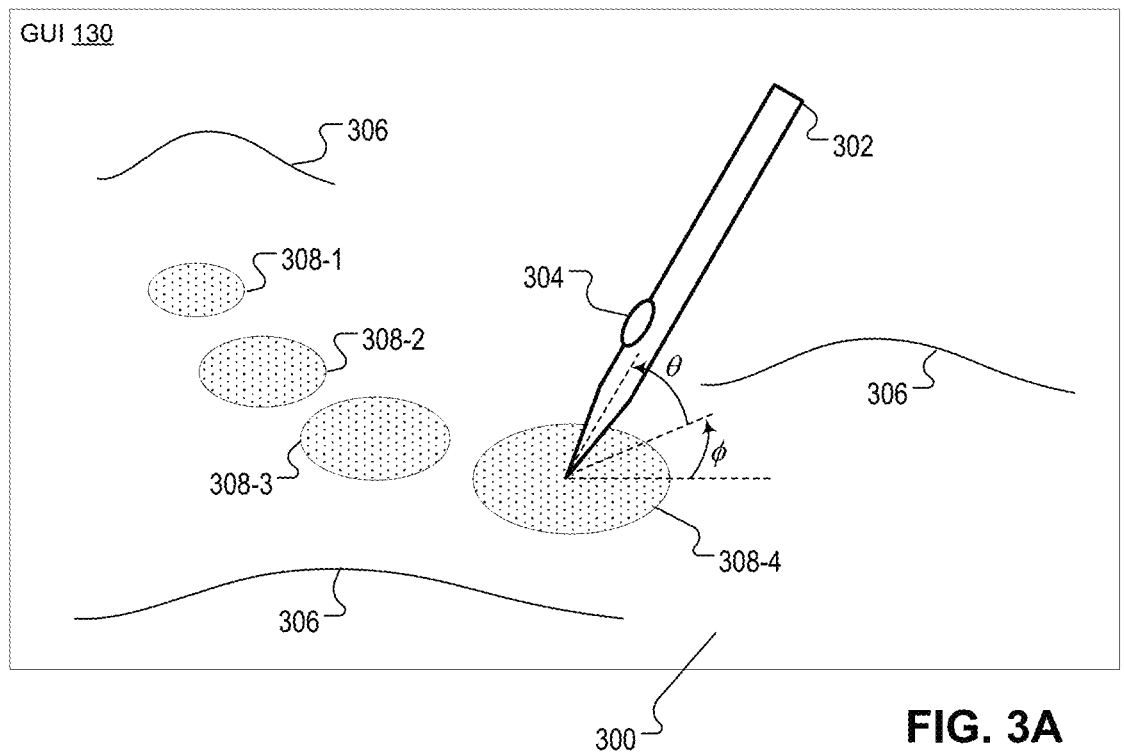
FIGS. 3A-F are exemplary illustrations of various granular media tools displayed on a graphical user interface of an application capable of provisioning simulated images of granular matter and enabling manipulations of the simulated images, in accordance with some implementation of the present disclosure.

FIGS. 3A-F are exemplary illustrations of various granular media tools displayed on a graphical user interface of an application capable of provisioning simulated images of granular matter and enabling manipulations of the simulated images, in accordance with some implementation of the present disclosure. FIG. 3A shows one non-limiting exemplary application of an "Add GM" tool. Shown on the GUI 130 is a stylus 302 indicating locations and amounts of GM to be added to the virtual drawing canvas 300. In some implementations, the stylus 302 is an image displayed by the GUI 130. In some implementations, the stylus 302 is an actual physical stylus held by the user against the touchscreen device (which may be the same device that also displays the GUI 130). The input values input via the stylus may involve the path of the stylus' tip across the GUI 130, the azimuthal angle φ (e.g., indicating the direction of the GM placement), the polar angle θ (which may indicate the rate of the GM placement). In some implementations, the stylus may have one or more buttons 304 that may provide additional inputs (e.g., the GM dispensing starts or stops when the button 304 is pressed). The application of the stylus may result in a series of GM placements 308-1, 308-2 . . . 308-N. As depicted schematically, the GM may be placed on the virtual drawing canvas 300 where previous GM deposits 306 are already present.

Figure 3B:
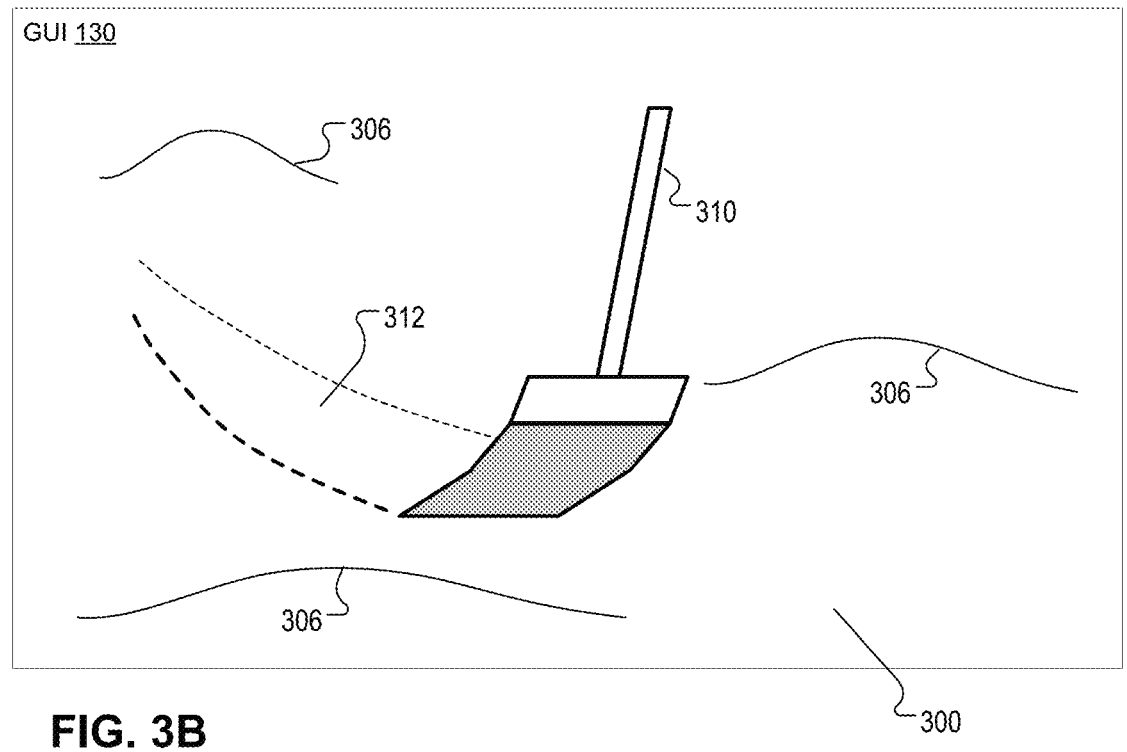

FIG. 3B shows one non-limiting exemplary application of a "Brush" tool. Shown on the GUI 130 is a brush 310 applied to a region of the virtual drawing canvas 300, such as the region 312. The region 312 may contain GM added previously using other GMTs. In some implementations, the brush 310 is an image displayed by the GUI 130. In some implementations, the brush 310 is a visual depiction of a stylus held by the user, of the user's finger pressed against the touchscreen device, or of some other way to provide the input. The input values that are input in association with the brush 310 may involve the path of the brush 310 across the GUI 130, the azimuthal angle φ and the polar angle θ (not shown), which may indicate the direction of the path of the brush 310, the speed of the brush, the pressure intended to be applied to the brush 310 by the user, and so on. In some implementations, where the actual physical stylus is used to simulate the brush 310, one or more buttons of the physical stylus may provide some of the above inputs or an additional input (e.g., by selecting the stylus button, the user may choose the pressure applied to the brush, the width of the brush, etc.).

Figure 3C:
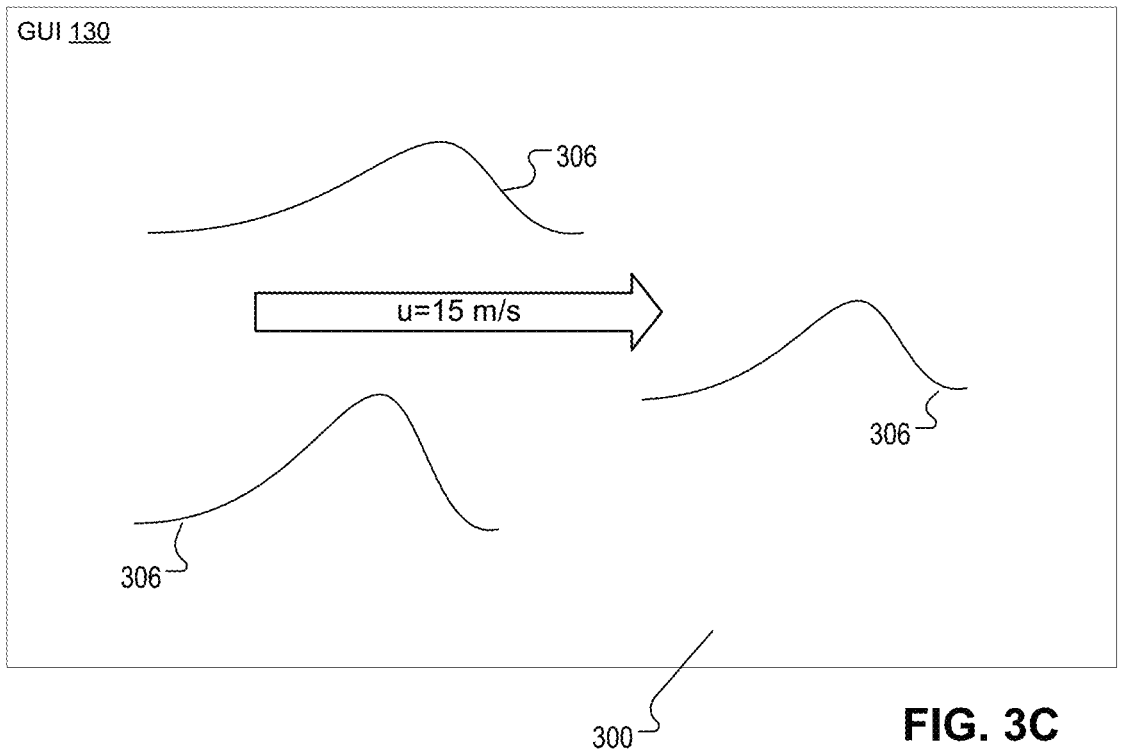

FIG. 3C shows one non-limiting exemplary application of an "Air Flow" ("Wind") tool. Shown on the GUI 130 is an arrow indicating the wind speed (e.g., 15 m/s, as depicted). The direction and the speed of the wind may be indicated by various input tools and methods, such as sweeping by a finger and/or stylus, selecting a direction on a wind rose, using a slider menu, etc. The duration of the wind may be controlled by the user by pressing and releasing the stylus button, tapping on the GUI, or by setting of the "Air Flow" tool.

Figure 3D:
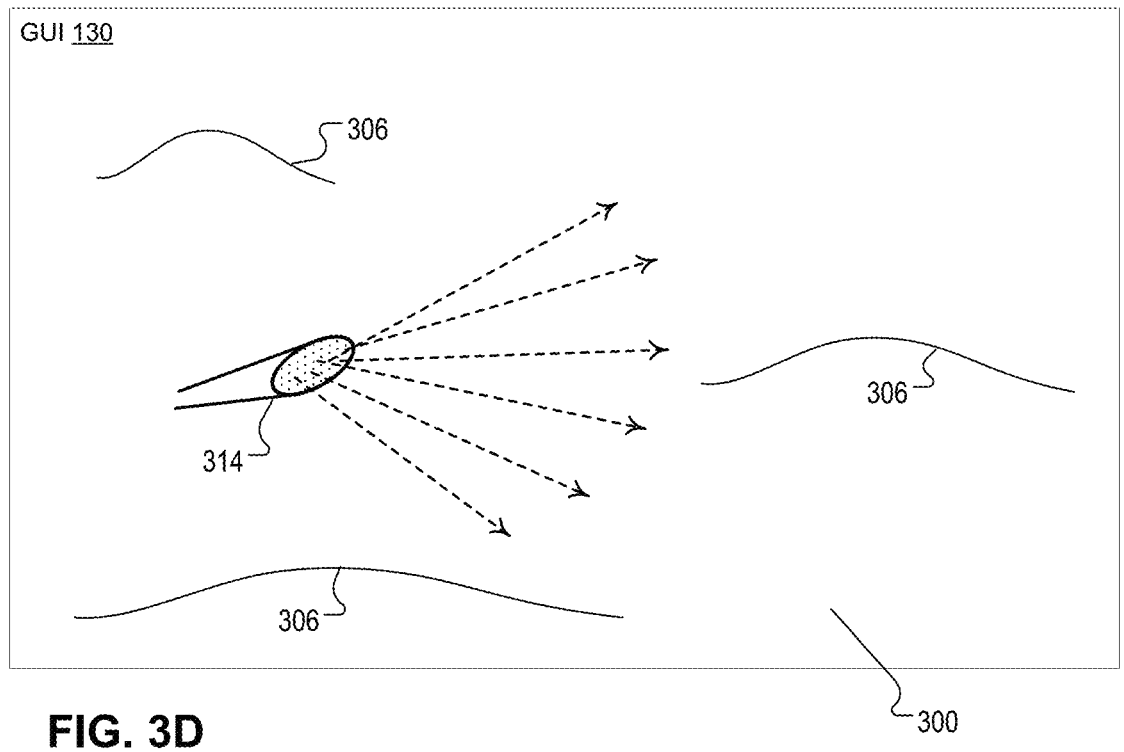

FIG. 3D shows one non-limiting exemplary application of a "Spread" ("Hose") tool. Shown on the GUI 130 is an opening of a GM dispensing device 314 with the arrows indicating which regions of the virtual canvas 300 the spread GM is reaching. The input values provided by the user (via some of the input devices described above) may include the reach of the GM deposition, the angle of the spread, the rate of the GM deposition, the distribution of the GM flow across the angular spread (e.g., whether the rate of the GM flow is uniform or non-uniform across the spread), and the like.

Figure 3E:
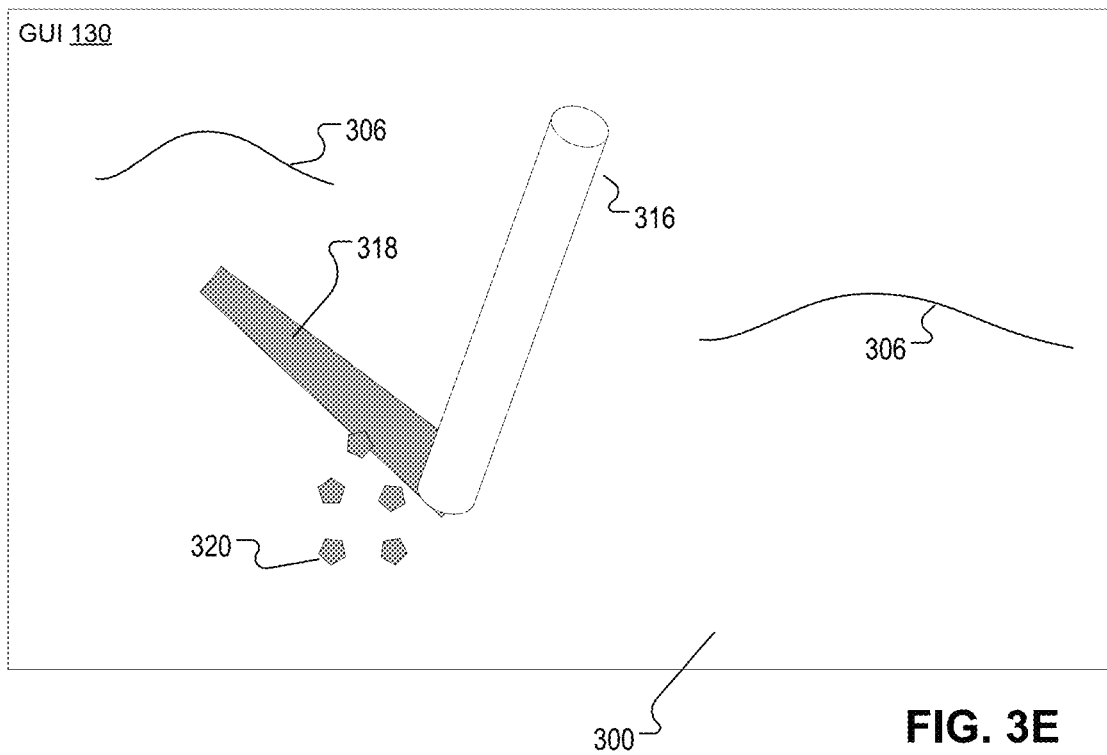

FIG. 3E shows one non-limiting exemplary application of a "Pencil" tool. Shown on the GUI 130 is a pencil or another writing implement 316 applied to a region of the virtual drawing canvas 300. Left behind is the primary trace 318 that includes particles adhering to the virtual canvas 300 as well as particles 320 that break off but remain loose on the surface of the canvas 300. In some implementations, the writing implement 316 is an image displayed by the GUI 130. In some implementations, the image of the writing implement 316 may be based on the positioning of the actual physical stylus held by the user, the user's finger pressed against the touchscreen device, or some other way to provide the input. The input values provided in association with the writing implement 316 may involve the path of the implement 316 across the GUI 130, the speed of the implement 316, the pressure intended to be applied to the implement 316 by the user, and so on. The pressure input value may be based on the actual pressure applied by the user (in the instances where the touchscreen is capable of discerning the pressure) or based on the angle at which the stylus is held to the touchscreen. The number (as well as size) of the particles 320 that break off from the writing implement 316 may depend on the pressure input value, as determined, e.g., by the particle characterization model 224.

Figure 3F:
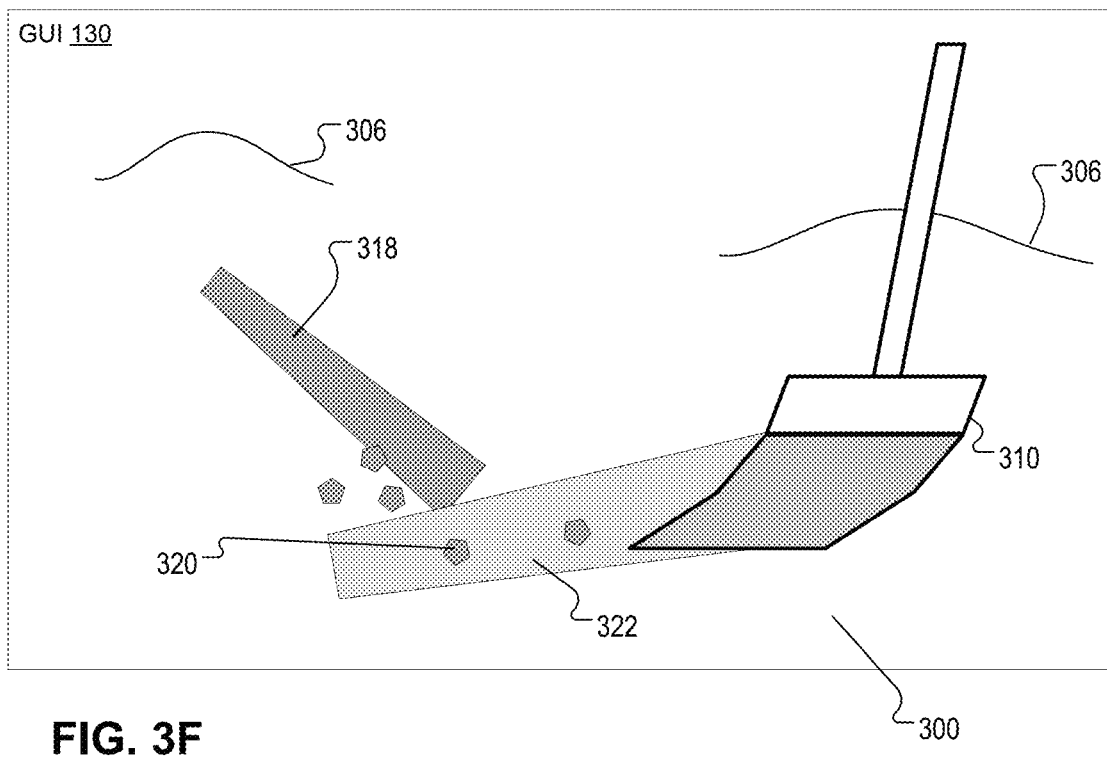

FIG. 3F shows one non-limiting exemplary application of the "Brush" tool following the application of the "Pencil" tool. Shown on the GUI 130 is the brush applied to a region of the virtual drawing canvas 300. The input values for the sweep operation may be input in the same or similar ways as described in reference to the "Brush" tool in FIG. 3B. Some of the particles 320 that broke off during the application of the writing implement 320, may be swept (and/or further crushed) by the brush 310 and may leave behind a pigmented trial 322. The width, the color and the intensity of the trail 322 may be determined by one or more models of the simulation module 114 and may depend on the variety inputs and settings: the width and stiffness of the brush, the size and the brittleness of the particles 320, the friction between the particles 320 and the virtual drawing canvas 300, the marking ability of the particles, and so on. In some implementations, the "Brush" tool may model application of a finger, a hand, a leg, etc. to the GM placed on the drawing canvas.

Various other GMT, not explicitly depicted in FIGS. 3A-F, may also be used. For example, a variety of "Filter" GM tools may be available to the user, such as a sieve tool or a colander tool, to filter out particles of an undesired size (e.g., particles whose size exceeds a user-controlled threshold). "Filter" tools may include various gratings, meshes, or other tools capable of redirecting application of GM to the canvas and/or specifying or modifying where the GM lands on the canvas, e.g., tools producing predetermined patterns. For example, a patterned mesh tool may cause the GM to be applied to the canvas in a periodic pattern. In some implementations, one or more "Filter" tools may be combined with one or more "Add" tools. Relative positions (e.g., height and horizontal coordinates) of the "Filter" and "Add" tools can be controlled by the user via pointing and/or menu devices. In some implementations, various "Filter" tools may be displayed on the GUI together with the GM already placed on the canvas, but in a way that may be distinct from how the GM is displayed, for the ease of perception. To reduce computational and graphics costs of displaying "Filer" tools, various components of the "Filter" tools may be displayed using a reduced bitmap representation, such as a black and white (or any other distinct color) map, a saturation map, a luminance map, and so on, or any combination of such maps For example, a "Filter" tool may be displayed with a brighter color indicating regions of the canvas that are masked (protected) from the GM and a darker color indicating regions that are accessible to the GM, or vice versa.

Figure 4A:
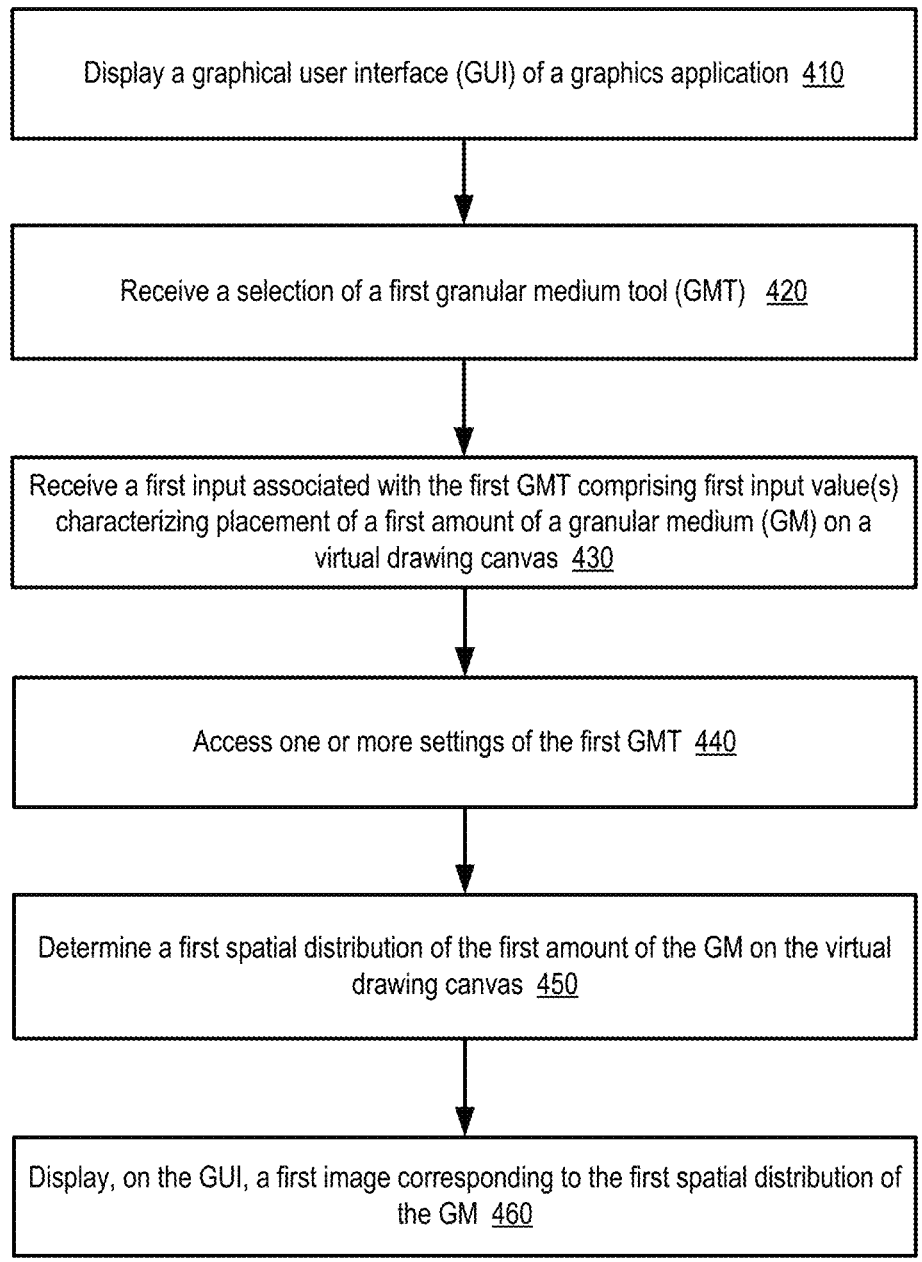
FIGS. 4A-C depict a flow diagram of one illustrative example of a method of providing, via a graphics application, an enhanced functionality to support creating, displaying, and manipulating images that contain depictions of granular media, in accordance with some implementation of the present disclosure.
Figure 4B:
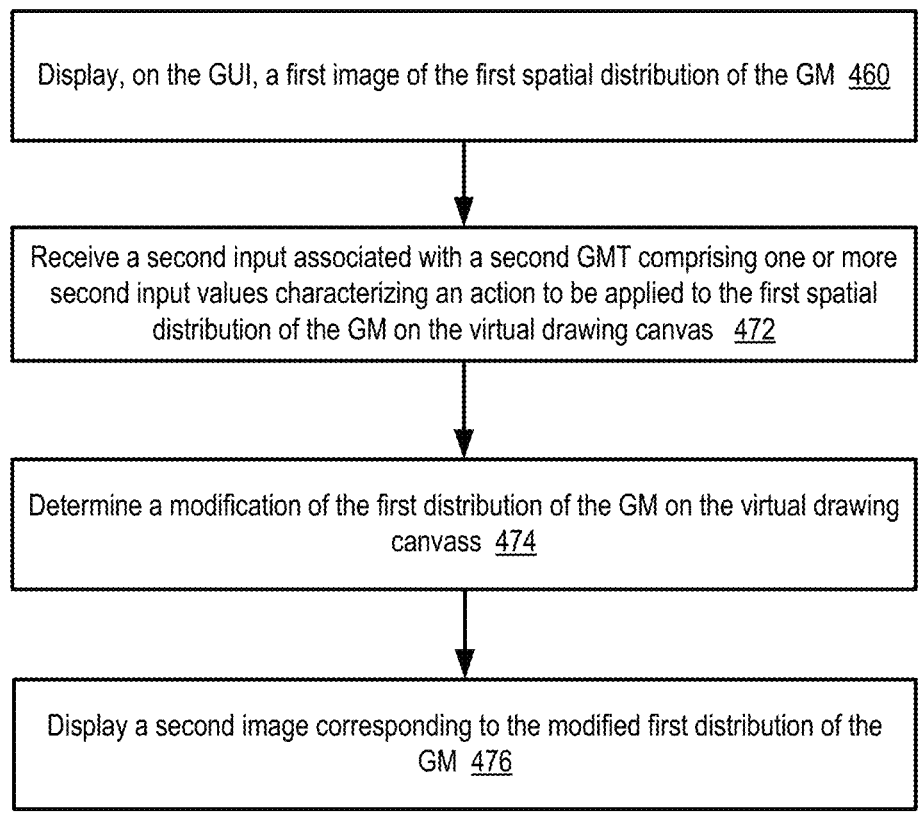
Figure 4C:
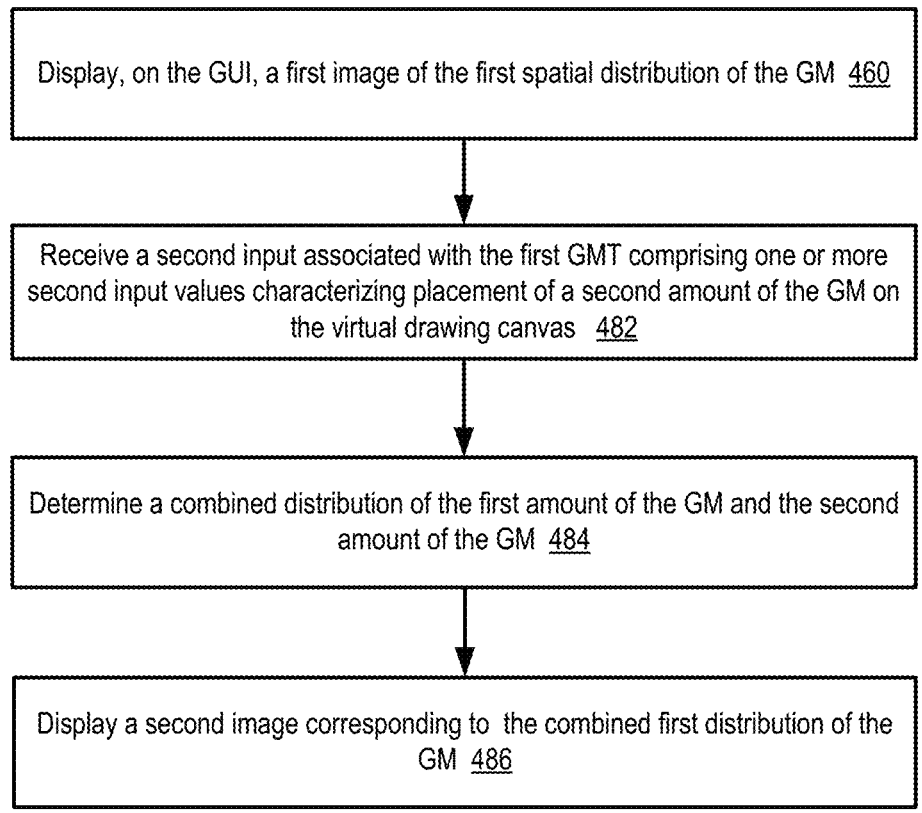

FIGS. 4A-C depict a flow diagram of one illustrative example of a method 400 of providing, via a graphics application, an enhanced functionality to support creating, displaying, and manipulating images that contain depictions of granular media, in accordance with some implementation of the present disclosure. Method 400 and/or each of its individual functions, routines, subroutines, or operations may be performed by one or more processing units of a processing device implementing the method, e.g., a computing system 102, or another device that is not explicitly shown in FIG. 1. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Various operations of method 400 may be performed in a different order compared with the order shown in FIGS. 4A-C. Some operations of the method may be performed concurrently with other operations. Some operations may be optional.

Method 400 may be directed to a computer system that supports a graphics application, such as the graphics application 110 of FIG. 1, in one implementation. As depicted in FIG. 4A, at block 410, the processing device performing method 400 may display (e.g., to a user) a graphical user interface (GUI) of the graphics application. At block 420, method 400 may continue with receiving, by the processing device, a selection of one of available granular medium tools (GMT). The selected (first) GMT may be capable of adding various granular media (GM) to a virtual drawing canvas, modifying (spreading, adding pigment) a previously added GM, or applying various effects to the GM (e.g., air flow, explosion, modification of gravity, creating a whirl, and so on). The selected first GMT may be available via a set of clickable buttons, via a menu (e.g., a pull-down menu), or may be voice and/or touch-activated, and the like. At block 430, method 400 may continue with the processing device receiving a first input associated with the first GMT. The first input may include one or more first input values characterizing placement of a first amount of a granular medium (GM) on the virtual drawing canvas. The first input values may include coordinates of a location where the GM is added. For example, a user may click a mouse (or any other display-pointing device) identifying a location (or a region) of the GUI or press a finger against a touchscreen associated with the GUI. The first input values may include a duration of the input, which may be indicative of the amount of GM added to the canvas. For example, the user may press the mouse button for a period of time to input how much GM should be added to the selected location, with each second (or fraction of a second) indicating a fixed amount of GM (which may be specified in GMT settings). In some implementations, the first input may include a rate of deposition of the first amount of the GM, which may be selectable by the display-pointing device. The first input values may include a set of points (or a continuous path) where the GM is to be added. In some implementations, the first input values may further include dimensions of a trace of deposition of the first amount of the GM. For example, the user may select a width of the GM dispenser being used to deposit the GM. The first input values may also include an identification of the type of the GM (e.g., sand, graphite, crayon, etc.) and/or color being added. In some implementations, when the selected GMT is a solid drawing implement (chalk, pastel, pencil, charcoal, etc.), the first input values may include an amount of pressure that the user intends to be applied to the implement.

At block 440, the processing device performing method 400 may access one or more settings of the GMT. For example, the settings of the GMT may include indications of a size of particles of the first amount of the GM, such as an average particle size and a dispersion (standard deviation) of the particle size. In some implementations, the selected GMT may be a solid drawing implement, and the settings of the GMT may include a size of particles that break off from the implement when the implement is pressed against the virtual drawing canvas, such as the average size, the dispersion, the minimum and the maximum size of the particles, and/or the like. The settings may further include multiple typical sizes of breaking-off particles, each size corresponding to different values of the applied pressure. In some implementations, the setting may include a degree of adhesion of the particles of the GM to the virtual drawing canvas. For example, the degree of adhesion may be small for sand, higher for charcoal and chalk, and yet higher for pastel and crayon. In some implementations, the settings may include a degree of friction between the particles of the GM and the virtual drawing canvas. In some implementations, the settings may include a speed of air flow (wind). The settings may also include a susceptibility of the particles of the GM to wind. The susceptibility may describe how likely the particles are to move when subjected to the air flow of a given speed. In one implementation, the susceptibility $\alpha$ may indicate the particle's drift speed v in the air flow: $v=a \cdot u$. In another implementation, the susceptibility $\beta$ may indicate the force acting on the particle in the air flow: $f=\beta \cdot u$. The settings may further include a marking ability of the particles of the GM. For example, the marking ability may indicate the color and the intensity of a line left by the particle (e.g., within the footprint left by the particle) when the particle is moved across an area of the virtual canvas. In some implementations, the intensity may increase with the pressure (when may be caused by a GMT, such as a brush or a writing implement) that the particle exerts on the virtual canvas.

At block 450, the processing device may determine, using the first input value(s) and the setting(s) of the GMT, a first spatial distribution of the first amount of the GM on the virtual drawing canvas. In some implementations, determining the spatial distribution of the GM may include performing one or more simulations by the simulation module 114.

The simulations may be performed using the first input value(s) and the setting(s) of the GMT as inputs. The spatial distribution of the first amount of the GM, output by the simulation module 114, may include an amount of the GM at a plurality of locations on the virtual drawing canvas. In some implementations, such amounts may be specified via particle density (number) maps $n_a(x, y, t_k)$ for various particles (of different types and colors) that have been placed on the virtual canvas, by an elevation map $h(x, y, t_k)$ indicating the height of a column of the GM at various points $(x, y)$ on the canvas, or in any other way indicating the amount of GM on the canvas.

In some implementations, performing the one or more simulations may include simulating motion of at least some of the particles of the GM across the virtual drawing canvas. Specifically, the simulation module 114 may determine the distribution of the particles, for a sequence of times, based on a variety of computational models. Such models may simulate physical properties of the GMT being used (e.g., drawing tool model 222), properties of particles of GM (e.g., particle characterization model 224), properties of the canvas (e.g., virtual canvas model 226), motion of the particles (e.g., particle dynamics model 228), or other models not explicitly shown in FIG. 2. For example, the simulations may be performed using a fluid model, to describe interaction of particles of the GM with various fluids (e.g., having a low or a high viscosity, surface tension, and density). The simulations may be performed using a pigment model, to describe how mixing of various types of GM and/or various colored or colorless fluids (water, oil, liquid paint, and so on) may change the appearance off the granular matter within the virtual drawing canvas. The simulations may also be performed using other mechanical, optical, and/or chemical models, to describe various aspects of the materials placed on the canvas.

At block 460, method 400 may continue with the processing device displaying, on the GUI, a first image corresponding to the first spatial distribution of the GM. For example, the processing device may compute how the first distribution is to appear to a user if viewed from a specific (e.g., selected by the user) vantage point, based on the amount of GM particles and their colors at various locations on the virtual drawing canvas. The processing device may produce one or more images (for various vantage points), and display the respective images to the user via the GUI. In some implementations, the representations of the GM may be realistic, indicating how the GM on the canvas may appear in the real world. In some implementations, the visualization of the GM may be functional, e.g., indicating some or all of the following: 1) recent changes made to the canvas, with the visual depictions (via colors, patterns, intensity maps) of the order of changes made to the canvas/GM, 2) types of GM present on the canvas, 3) wetness, density, pigmentation ability, etc., 4) representations of GM motion, 5) representations of three-dimensional distributions of the GM (topographic maps or other relief representations), 6) other similar functional representations. In some implementations, some of the functional representations can be superimposed over realistic representations of the GM. The number and types of the representations displayed may be controlled by the user via a representation menu or any other tools available to receive user inputs.

As depicted in FIG. 4B, in one possible expansion 470 of method 400, the processing device may receive, at block 472, a second input associated with a second GMT. The second input may include one or more second input values characterizing an action to be applied to the first spatial distribution of the GM on the virtual drawing canvas. For example, the action may be to apply a brush stroke (a finger smudge, a sweep with a solid object, etc.) to the first spatial distribution of the GM on the virtual drawing canvas. The second input values may include a width of the brush (a size or the finger(s) detected by the touchscreen, a number of the fingers, and so on), a length of the brush bristles, a pressure exerted by the brush, a trajectory of the brush stroke, and the like. In some implementations, the action may be to apply an air flow to the first spatial distribution of the GM on the virtual drawing canvas. In such instances, the second input values may include a width of the air front, a speed of the air flow and so on.

At block 474, method 400 may continue with the processing device determining, using the second input values(s) how the first distribution of the GM on the virtual drawing canvas may be modified by the action received at block 472. In determining the modified distribution, the processing device may access some of the settings of the second GMT, such as some of the mechanical, optical, and/or chemical properties of the second GMT. The modified distribution may be determined in a way similar to block 450, e.g., using one or more simulation models. At block 476, method 400 may continue with displaying, on the GUI, a second image corresponding to the modified first distribution of the GM, which may be performed similar to operations of block 460.

As depicted in FIG. 4C, in another possible expansion 480 of method 400, the processing device may receive, at block 482, a second input associated with a second GMT. In some implementations, the second GMT may be a GMT that is different from the first GMT. For example, the first GMT may be a tool that adds GM to a localized area of the virtual drawing canvas whereas the second GMT may be a tool that sprays additional GM over an extended area of the canvas. In some implementations, the second GMT may be a second (e.g., a later) instance of application of the first GMT, but associated with second input values that are different from the first input values. For example, the second input values may characterize placement of a second amount of the same GM to a different area of the virtual drawing canvas. The second input values may also correspond to adding a different GM to the same (or different) area of the canvas (compared to the first input). In some implementations, the second amount of the GM may be of a different material type or color than the first amount of the GM.

At block 484, method 400 may continue with the processing device determining, using the second input value(s) how the first distribution of the GM on the virtual drawing canvas may be modified by the second input received at block 482 and what a resulting combined distribution of the GM on the canvas may be. In determining the second (combined) distribution, the processing device may access some of the settings of the second GMT, such as some of the mechanical, optical, and/or chemical properties of the second GMT. The combined distribution may be determined in a way similar to block 450, e.g., using one or more simulation models. At block 486, method 400 may continue with displaying, on the GUI, a second image corresponding to the combined distribution of the GM, which may be performed similar to operations of block 460.

Figure 5:
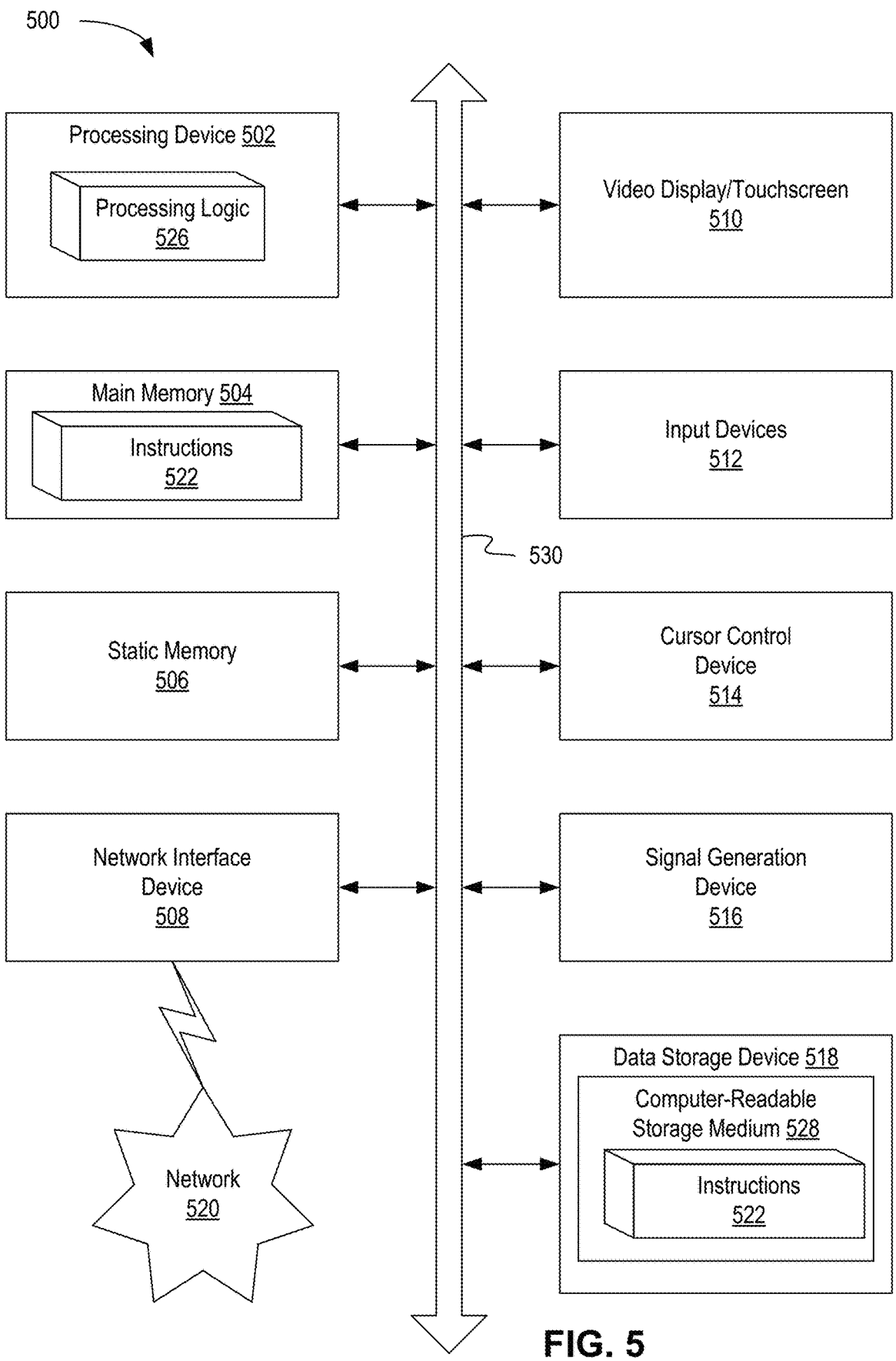
FIG. 5 depicts a block diagram of an example computer device capable of supporting graphics applications providing simulated images of granular matter and enabling manipulations of the simulated images, in accordance with some implementation of the present disclosure.

FIG. 5 depicts a block diagram of an example computer device 500 capable of supporting graphics applications providing simulated images of granular matter and enabling manipulations of the simulated images, in accordance with some implementation of the present disclosure. In various illustrative examples, various components of the computer device 500 may represent various components of the system hardware 104 illustrated in FIG. 1.

Example computer device 500 may be connected to other computer devices in a LAN, an intranet, an extranet, and/or the Internet. Computer device 500 may operate in the capacity of a server in a client-server network environment. Computer device 500 may be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 500 may include a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processing device 502 represents one or more general-purpose processing devices such as a microprocessor, central processing unit, or the like. More particularly, processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 may be configured to execute instructions implementing method 400 of providing, via a graphics application, an enhanced functionality to support creating, displaying, and manipulating images that contain depictions of granular media.

Example computer device 500 may further comprise a network interface device 508, which may be communicatively coupled to a network 520. Example computer device 500 may further comprise a video display and/or touch-screen 510 (e.g., a liquid crystal display (LCD), a touch-sensing screen, or a cathode ray tube (CRT)), input devices 512 (e.g., a keyboard, a microphone, a camera, a stylus, a scanner), a cursor control device 514 (e.g., a mouse, a stylus), and an acoustic signal generation device 516 (e.g., a speaker).

Data storage device 518 may include a computer-readable storage medium (or, more specifically, a non-transitory computer-readable storage medium) 528 on which is stored one or more sets of executable instructions 522. In accordance with one or more aspects of the present disclosure, executable instructions 522 may comprise executable instructions implementing method 400 of providing, via a graphics application, an enhanced functionality to support creating, displaying, and manipulating images that contain depictions of granular media.

Executable instructions 522 may also reside, completely or at least partially, within main memory 504 and/or within processing device 502 during execution thereof by example computer device 500, main memory 504 and processing device 502 also constituting computer-readable storage media. Executable instructions 522 may further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   establishing by a graphics application in execution upon a processing device of a computing device a set of spatial distributions of a first amount of a granular medium applied to a virtual drawing canvas rendered within a graphical user interface (GUI) of the graphics application by a granular medium tool by a user of the graphics application; wherein
   the granular medium comprises at least one of particulate matter and granular matter;
   one or more settings of the granular medium tool relate to properties of the at least one of particulate matter and granular matter within the granular medium; and
   the set of spatial distributions comprises:
      a first spatial distribution of the least one of particulate matter and granular matter within a portion of a first amount of the granular medium placed on the virtual drawing canvas that is fixed to the virtual drawing canvas; and
      a second spatial distribution of the at least one of particulate matter and granular matter within a remainder of the first amount of the granular medium placed on the virtual drawing canvas that is not fixed to the virtual drawing canvas; and
   the portion of the first amount of the granular medium placed on the virtual drawing canvas that is fixed to the virtual drawing canvas is determined in dependence upon at least of:
      a degree of friction of the at least one of particulate matter and granular matter within the granular medium and the virtual drawing canvas; and
      a degree of adhesion of the at least one of particulate matter and granular matter within the granular medium and the virtual drawing canvas.

2. The method according to claim 1, wherein
   the one or more settings of the granular medium tool further comprise a setting relating to friction of a tool associated with the granular medium tool; and
   motion of the tool associated with the granular medium tool within the graphics application removes portions of a previously applied granular medium in a random manner in dependence upon the setting relating to friction of the tool.

3. The method according to claim 1, wherein
   the one or more settings of the granular medium tool further comprise a setting relating to friction of the granular medium associated with the granular medium tool; and
   motion of a tool associated with the granular medium tool within the graphics application removes portions of a previously applied granular medium in a random manner in dependence upon the setting relating to friction of the granular medium.

4. The method according to claim 1, further comprising
   receiving one or more inputs relating to a subsequent application of another tool with respect to a portion of the virtual drawing canvas associated with the second spatial distribution;
   determining in dependence upon one or more settings of the another tool and the one or more inputs a modified second spatial distribution of the at least one of particulate matter and granular matter within the granular medium that was not fixed to the virtual drawing canvas and a third spatial distribution of the set of spatial distributions; and
   displaying, on the GUI, a second image generated in dependence upon a first image, the modified second spatial distribution and the third spatial distribution.

5. The method according to claim 1, further comprising
   receiving one or more inputs relating to a subsequent application of another tool with respect to a portion of the virtual drawing canvas associated with the second spatial distribution;
   determining in dependence upon one or more settings of the another tool, the one or more inputs and the second spatial distribution of the at least one of particulate matter and granular matter within the granular medium that was not fixed to the virtual drawing canvas a third spatial distribution of the set of spatial distributions and a fourth spatial distribution of the set of spatial distributions; and
   displaying, on the GUI, a second image generated in dependence upon a first image, the first spatial distribution, the third spatial distribution, and the fourth spatial distribution; wherein
   the third spatial distribution comprises a spatial distribution of the remainder of the first amount of the granular medium placed on the virtual drawing canvas that was not fixed to the virtual drawing canvas during application by the granular medium tool which is now fixed to the virtual drawing canvas through the subsequent application of the another tool; and
   the fourth spatial distribution comprises a spatial distribution of the remainder of the first amount of the granular medium placed on the virtual drawing canvas that was not fixed to the virtual drawing canvas during application by the granular medium tool of the which is still not fixed to the virtual drawing canvas through the subsequent application of the another tool.

6. The method according to claim 1, wherein
   the one or more settings of the granular medium tool comprise at least one of a hardness and a brittleness of the granular medium employed in establishing the first amount of the granular medium; and
   a tool associated with the granular medium tool is a solid source of the granular medium.

7. The method according to claim 1, further comprising
establishing one or more tool settings relating to a tool associated with the granular medium tool applying the first amount of the granular medium; wherein
the one or more settings of the granular medium tool comprise at least one of a hardness and a brittleness of the granular medium;
the one or more settings of the granular medium tool and the one or more tool settings are employed in establishing the first amount of the granular medium; and
the tool associated with the granular medium tool is a solid source of the granular medium.

8. The method according to claim 1, further comprising
establishing one or more tool settings relating to a tool associated with the granular medium tool applying the first amount of the granular medium; wherein
the one or more settings of the granular medium tool comprise at least one of a hardness and a brittleness of the granular medium;
the one or more settings relating to the tool are selected from the group comprising an amount of force applied by the tool to the virtual drawing canvas and a distribution of the force applied by the tool to the virtual drawing canvas;
the one or more settings of the granular medium tool and the one or more tool settings are employed in establishing the first amount of the granular medium; and
the tool associated with the granular medium tool is a solid source of the granular medium.

9. The method according to claim 1, wherein
a first image is rendered with a specific mapping indicating that the set of spatial distributions of the first amount of the granular medium applied to the virtual drawing canvas was a recent change to the virtual drawing canvas relative to the virtual drawing canvas prior to the placement of the first amount of the granular medium with the granular medium tool;
the specific mapping is established in dependence upon at least one of a color map, a pattern map, and an intensity map; and
the at least one of the color map, the pattern map, and the intensity map defines the specific mapping as a function of time from the placement of the first amount of the granular medium with the granular medium tool.

10. The method according to claim 1, wherein
a first image is rendered with a specific mapping indicating that the set of spatial distributions of the first amount of the granular medium applied to the virtual drawing canvas is a recent change to the virtual drawing canvas relative to the virtual drawing canvas prior to the placement of the first amount of the granular medium with the granular medium tool;
previous changes to the virtual drawing canvas are rendered within the first image with other specific mappings; and
the specific mapping is established in dependence upon at least one of a color map, a pattern map and an intensity map defining the mapping to be applied as a function of time from the time that the first amount of the granular medium was applied with the granular medium tool; and
each of the other specific mappings is established in dependence upon the at least one of the color map, the pattern map and the intensity map as a function of time since the previous change associated with that other specific mapping was made.

11. The method according to claim 1, wherein
a first image is rendered with a specific mapping indicating that the set of spatial distributions of the first amount of the granular medium applied to the virtual drawing canvas is a recent change to the virtual drawing canvas relative to the virtual drawing canvas prior to the placement of the first amount of the granular medium with the granular medium tool;
previous changes to the virtual drawing canvas are rendered within the first image with other specific mappings; and
the specific mapping and other specific mappings are established in dependence upon at least one of a color map, a pattern map, and an intensity map; and
the at least one of the color map, the pattern map and the intensity map indicates at least one of different various types of granular medium applied to the virtual drawing canvas, wet versus dry areas of the virtual drawing canvas, and dense versus loose areas of the granular medium applied to the virtual drawing canvas.

12. The method according to claim 1, further comprising
rendering a topographical map associated with at least one of a first image and a portion of the virtual drawing canvas visible to a user of the graphics application within the GUI; wherein
the topographical map indicates a three-dimensional distribution of the granular medium applied to the virtual drawing canvas.

13. The method according to claim 1, wherein
a first image is rendered with at least one of:
    a specific mapping indicating that the subset of the set of spatial distributions of the first amount of the granular medium was a recent change to the virtual drawing canvas; and
    a topographical map associated with at least one of the first image and a portion of the virtual drawing canvas visible to a user of the graphics application within the GUI;
previous changes to the virtual drawing canvas are rendered within the first image with other specific mappings;
the specific mapping is established in dependence upon at least one of a color map, a pattern map, and an intensity map;
the at least one of the color map, the pattern map and the intensity map indicates at least one of different various types of granular medium applied to the virtual drawing canvas, wet versus dry areas of the virtual drawing canvas, and dense versus loose areas of the granular medium applied to the virtual drawing canvas;
the topographical map indicates a three-dimensional distribution of the granular medium applied to the virtual drawing canvas; and
the user of the graphics application can switch between a series of views wherein a first view of the series of views is a realistic view of the virtual drawing canvas, a second view of the series of views is functional comprising at least the at least one of the specific mapping and the topographical map, and a third view of the series of views is at least either the specific mapping or the topographical map.

14. The method according to claim 1, further comprising
receiving one or more inputs relating to application of air flow with respect to a portion of the virtual drawing canvas associated with the second spatial distribution;
determining in dependence upon the one or more inputs, the one or more settings of the granular medium tool and the second spatial distribution of the at least one of particulate matter and granular matter within the granular medium not fixed to the virtual drawing canvas a third spatial distribution and a fourth spatial distribution; and displaying, on the GUI, a second image generated in dependence upon a first image, the third spatial distribution, and the fourth spatial distribution; wherein the third spatial distribution comprises a spatial distribution of the at least one of particulate matter and granular matter within the granular medium which is now fixed to the virtual drawing canvas; and the fourth spatial distribution comprises a spatial distribution of the at least one of particulate matter and granular matter within the granular medium which is still not fixed to the virtual drawing canvas.

15. The method according to claim 1, wherein
the set of spatial distributions of the first amount of the granular medium on the virtual drawing canvas are further established in dependence upon one or more canvas settings;
the first amount of the granular medium on the virtual drawing canvas is established in dependence upon one or more canvas settings and the one or more settings of the granular medium tool; and
each canvas setting of the one or more canvas settings relates to at least one of a smoothness of the virtual drawing canvas and an abrasiveness of the virtual drawing canvas.

16. The method according to claim 1, further comprising
receiving one or more inputs relating to application of air flow with respect to a portion of the virtual drawing canvas associated with the second spatial distribution;
establishing one or more canvas settings relating to the virtual drawing canvas, where each canvas setting of the one or more canvas settings relates to a smoothness of the virtual drawing canvas, an abrasiveness of the virtual drawing canvas, a degree of adhesion of the granular medium to the virtual drawing canvas, and a degree of wetness of the virtual drawing canvas;
determining in dependence upon the one or more settings of the granular medium tool, the second spatial distribution of the at least one of particulate matter and granular matter within the granular medium not fixed to the virtual drawing canvas, the one or more inputs, and the one or more canvas settings a third spatial distribution and a fourth spatial distribution; and
displaying, on the GUI, a second image generated in dependence upon a first image, the third spatial distribution, and the fourth spatial distribution; wherein
the third spatial distribution comprises a spatial distribution of the at least one of particulate matter and granular matter within the granular medium which is now fixed to the virtual drawing canvas; and
the fourth spatial distribution comprises a spatial distribution of the at least one of particulate matter and granular matter within the granular medium which is still not fixed to the virtual drawing canvas.

17. The method according to claim 1, further comprising
receiving one or more inputs relating to application of a tool with respect to a portion of the virtual drawing canvas associated with the second spatial distribution;
establishing one or more canvas settings relating to the virtual drawing canvas, where each canvas setting of the one or more canvas settings relates to a smoothness of the virtual drawing canvas, an abrasiveness of the virtual drawing canvas, a degree of adhesion of the granular medium to the virtual drawing canvas, and a degree of wetness of the virtual drawing canvas;
establishing one or more geometry settings, each geometry setting defining either an aspect of a three-dimensional geometry of the virtual drawing canvas or an aspect of friction of the virtual drawing canvas;
determining in dependence upon the one or more settings of the granular medium tool, the one or more inputs, the one or more canvas settings, the one or more geometry settings, and the second spatial distribution a third spatial distribution and a fourth spatial distribution; and
displaying, on the GUI, a second image generated in dependence upon a first image, the third spatial distribution, and the fourth spatial distribution; wherein
the third spatial distribution comprises a spatial distribution of the at least one of particulate matter and granular matter within the granular medium which is now fixed to the virtual drawing canvas as a result of at least one of gravitational force and frictional force upon the second spatial distribution; and
the fourth spatial distribution comprises a spatial distribution of the at least one of particulate matter and granular matter within the granular medium which is still not fixed to the virtual drawing canvas.

18. The method according to claim 1, wherein
the set of spatial distributions are established in dependence upon the application of a particle dynamics model to a plurality of particles representing the at least one of the particulate matter and granular matter within the granular medium;
the particle dynamics model is executed for a predetermined period of time and incorporates at least one of gravitational forces, frictional forces between the plurality of particles, elastic collisions between the plurality of particles, inelastic collisions between the plurality of particles, partially inelastic collisions between the plurality of particles, and motion of a tool associated with the granular medium tool to establish velocities of the plurality of particles within the particle dynamics model.

19. The method according to claim 1, wherein
the set of spatial distributions are established in dependence upon the application of a particle characterization model to a plurality of particles representing the at least one of the particulate matter and granular matter within the granular medium;
the particle characterization model determines for the plurality of particles at least one of:
  a rate at which the plurality of particles are generated in dependence upon a pressure of a tool associated with the granular medium tool applying the first amount of the granular medium against the virtual display canvas;
  an average size of the plurality of particles;
  a standard deviation in the size of the plurality of particles;
  for each individual particle of the plurality of particles a likelihood that the particle will break into a number of smaller particles; and
  for each individual particle of the plurality of particles a likelihood that the particle will leave an impression on the virtual drawing canvas.

20. The method according to claim 1, wherein
establishing by the graphics application the subset of spatial distributions of the first amount of the granular medium applied to the virtual drawing canvas by the granular medium tool by the user of the graphics application comprises:

displaying, by the processing device of the computing device, the GUI of the graphics application;

receiving a selection of the granular medium tool relating to the granular medium comprising the at least one of particulate matter and granular matter;

receiving a first input associated with the granular medium tool, the first input comprising one or more first input values characterizing placement of the first amount of the granular medium on the virtual drawing canvas;

accessing one or more settings of the granular medium tool relating to properties of the at least one of particulate matter and granular matter within the granular medium;

determining, by the processing device, using the one or more first input values and the one or more settings, the set of spatial distributions of the first amount of the granular medium on the virtual drawing canvas; and displaying, on the GUI, a first image corresponding to a subset of the set of spatial distributions of the first amount of the granular medium.

* * * * *